(12) United States Patent
Madisetti et al.

(10) Patent No.: US 12,306,859 B2
(45) Date of Patent: May 20, 2025

(54) METHOD AND SYSTEM FOR PROTECTING AND REMOVING PRIVATE INFORMATION USED IN LARGE LANGUAGE MODELS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

(21) Appl. No.: 18/744,199

(22) Filed: Jun. 14, 2024

(65) Prior Publication Data

US 2024/0411789 A1 Dec. 12, 2024

Related U.S. Application Data

(63) Continuation-in-part of application No. 18/406,906, filed on Jan. 8, 2024, now Pat. No. 12,158,904, which is a continuation-in-part of application No. 18/470,487, filed on Sep. 20, 2023, now Pat. No. 12,147,461, which is a continuation of application No. 18/348,692, filed on Jul. 7, 2023, now Pat. No. 12,001,462.

(60) Provisional application No. 63/551,548, filed on Feb. 9, 2024, provisional application No. 63/604,909, filed on Dec. 1, 2023, provisional application No. 63/604,910, filed on Dec. 1, 2023, provisional application No. 63/602,675, filed on Nov. 27, 2023, provisional application No. 63/469,571, filed on May
(Continued)

(51) Int. Cl.
*G06F 16/3329* (2025.01)
*G06F 40/284* (2020.01)

(52) U.S. Cl.
CPC ........ *G06F 16/3329* (2019.01); *G06F 40/284* (2020.01)

(58) Field of Classification Search
CPC .......................... G06F 16/3329; G06F 40/284
See application file for complete search history.

(56) References Cited

U.S. PATENT DOCUMENTS 11,366,963 B1 * 6/2022 Morrison .............. G06F 40/186
12,182,102 B1   12/2024 Matton et al.
(Continued)

FOREIGN PATENT DOCUMENTS

CN      115661578 A   *   1/2023

OTHER PUBLICATIONS

Google Translation of CN 115661578 A, 2023, https://patents.google.com/patent/CN115661578A/en?oq=CN+115661578+A (Year: 2023).*
(Continued)

*Primary Examiner* — Eric Yen
(74) *Attorney, Agent, or Firm* — Daniel C. Pierron; Widerman Malek, PL

(57) ABSTRACT

A method for generating adversarial data for use in a large language model (LLM) including receiving an input condition at a generator neural network, generating synthetic data responsive to the input condition, a distribution of the synthetic data being configured to diverge from a distribution of authentic data, receiving each of the input condition, the synthetic data, and the authentic data at a discriminator neural network, and classifying each of the synthetic data and the authentic data as being one of authentic or synthetic by the discriminator neural network.

24 Claims, 26 Drawing Sheets

Related U.S. Application Data

30, 2023, provisional application No. 63/463,913, filed on May 4, 2023.

(56) References Cited

U.S. PATENT DOCUMENTS

| | | | |
|---|---|---|---|
| 2018/0336439 A1* | 11/2018 | Kliger | G06N 3/088 |
| 2019/0198156 A1* | 6/2019 | Madani | G06N 3/082 |
| 2020/0019863 A1* | 1/2020 | Dua | G06F 16/313 |
| 2020/0193272 A1* | 6/2020 | Chudak | G06N 3/06 |
| 2020/0213354 A1* | 7/2020 | Chakraborty | G06F 9/4416 |
| 2020/0227030 A1 | 7/2020 | Tan et al. | |
| 2021/0125031 A1* | 4/2021 | Keng | G06N 3/044 |
| 2021/0165938 A1* | 6/2021 | Bailey | G06N 3/047 |
| 2021/0271591 A1* | 9/2021 | Trost | G06N 3/047 |
| 2021/0279841 A1* | 9/2021 | Liu | G06T 3/4046 |
| 2021/0374802 A1 | 12/2021 | Longo et al. | |
| 2021/0390426 A1 | 12/2021 | Nair et al. | |
| 2022/0129732 A1* | 4/2022 | Chakrabarty | G06F 30/398 |
| 2022/0358225 A1 | 11/2022 | Gadde et al. | |
| 2022/0414103 A1 | 12/2022 | Upadhyay et al. | |
| 2023/0137378 A1 | 5/2023 | Laterza et al. | |
| 2024/0070439 A1 | 2/2024 | Segars et al. | |
| 2024/0378394 A1 | 11/2024 | Kotikalapudi et al. | |
| 2024/0403710 A1 | 12/2024 | Licato et al. | |

OTHER PUBLICATIONS

U.S. Appl. No. 18/348,692, filed Jul. 7, 2023.
U.S. Appl. No. 18/470,487, filed Sep. 20, 2023.
U.S. Appl. No. 18/406,906, filed Jan. 8, 2024.
Notice of Allowance received in related U.S. Appl. No. 18/406,906.
Notice of Allowance received in related U.S. Appl. No. 18/971,687 issued on Mar. 12, 2025; 20 pages.

* cited by examiner

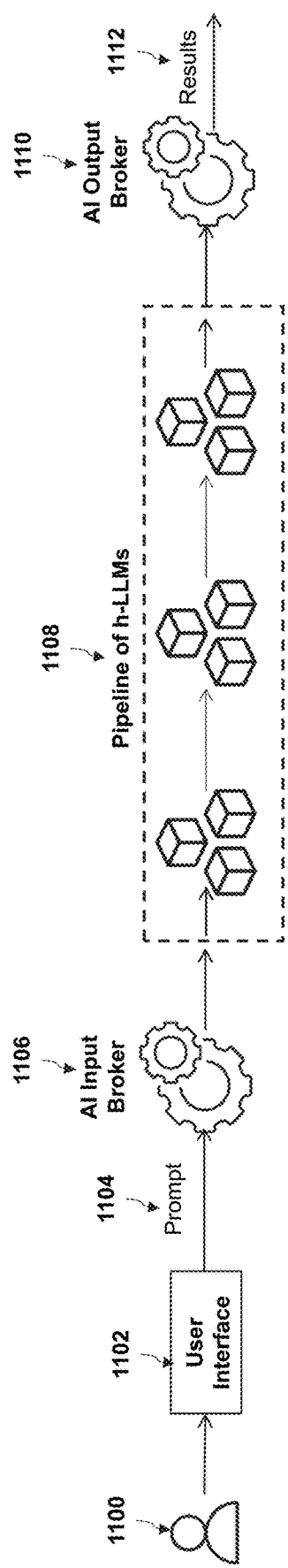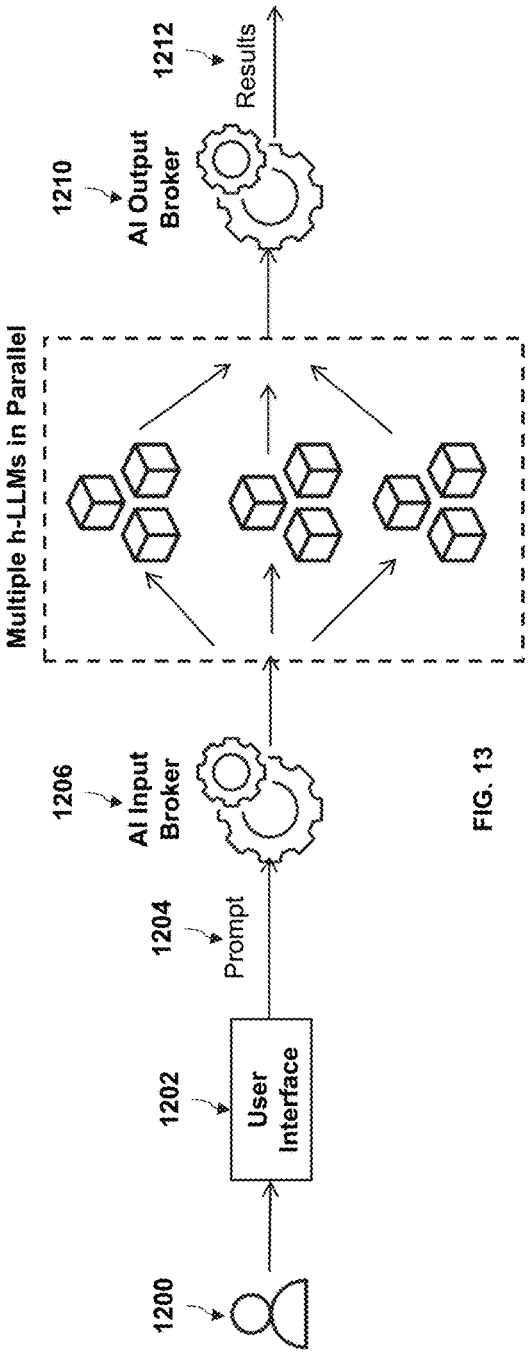
FIG. 12
FIG. 13

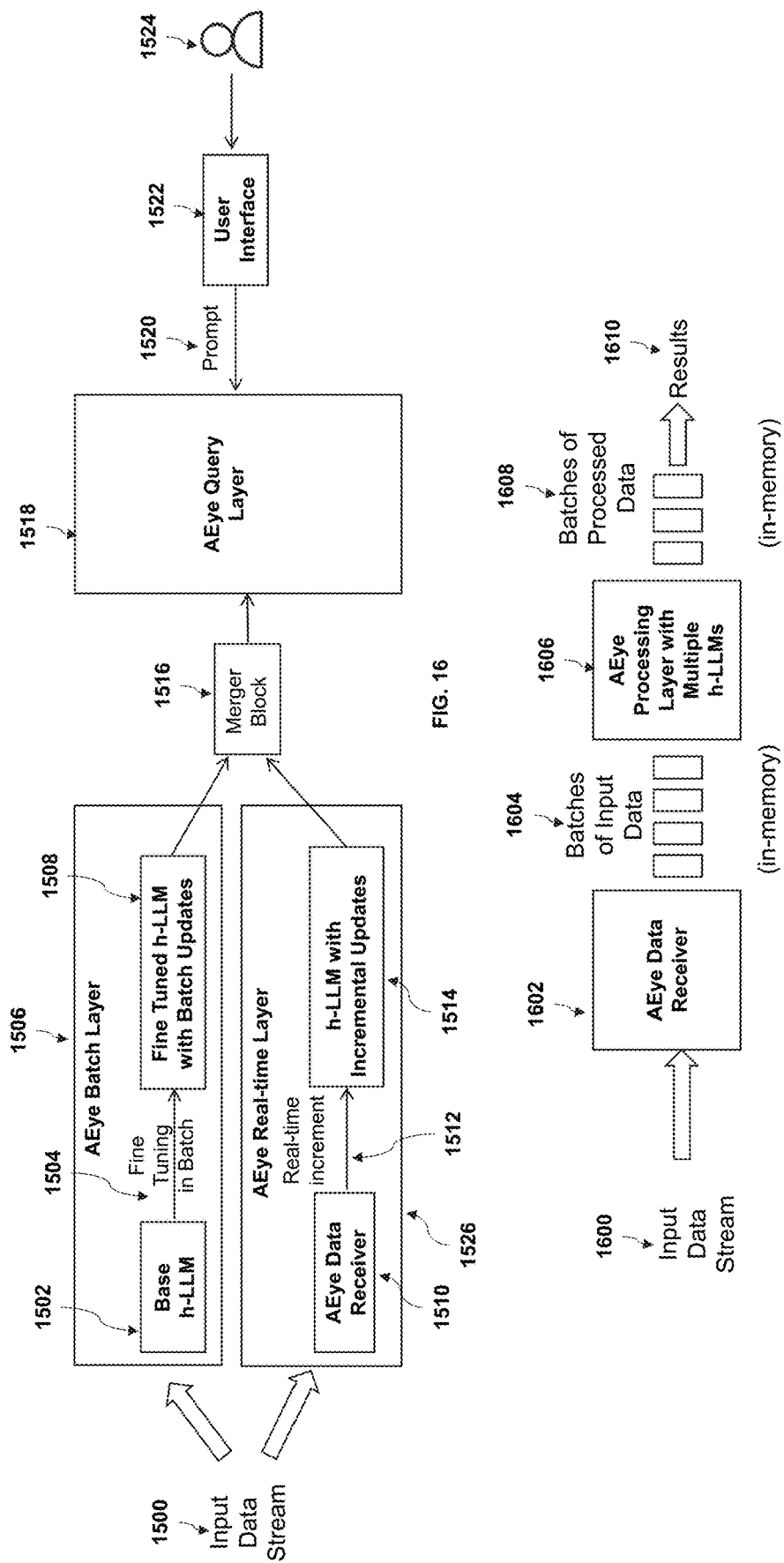

$L_{adv} = \sum [(1 - U(x)) * Divergence(G(x), Real(x))]$ $L_G = L_{adv} + \lambda * CrossEntropy(Discriminator)$

METHOD AND SYSTEM FOR PROTECTING AND REMOVING PRIVATE INFORMATION USED IN LARGE LANGUAGE MODELS

RELATED APPLICATIONS

This application is a continuation-in-part of and claims priority under 35 U.S.C. § 120 of U.S. patent application Ser. No. 18/406,906 filed on Jan. 8, 2024 and titled Method and System for Protecting and Removing Private Information Used in Large Language Models, which in turn is a continuation-in-part application of and claims priority under is a continuation-in-part application of and claims priority under 35 U.S.C. § 120 of U.S. patent application Ser. No. 18/470,487 filed on Sep. 20, 2023 and titled Method and System for Multi-Level Artificial Intelligence Supercomputer Design, which in turn is a continuation application of and claims priority under 35 U.S.C. § 120 of U.S. patent application Ser. No. 18/348,692 filed on Jul. 7, 2023 and titled Method and System for Multi-Level Artificial Intelligence Supercomputer Design, which in turn claims priority under 35 U.S.C. § 119 (e) of U.S. Provisional Patent Application Ser. No. 63/463,913 filed on May 4, 2023 and titled New Tools for Document Analysis in CatchUp and U.S. Provisional Patent Application Ser. No. 63/469,571 filed on May 30, 2023 and titled Multilevel AI PSupercomputer Design. This application additionally claims priority under 35 U.S.C. § 119 (e) of U.S. Provisional Patent Application Ser. No. 63/602,675 filed on Nov. 27, 2023 and titled Object detection combined with LLMs and U.S. Provisional Patent Application Ser. No. 63/604,910 filed on Dec. 1, 2023 and titled Targeted Forgetting in LLMs—Details. This application further claims priority under 35 U.S.C. § 119 to U.S. Provisional Patent Application Ser. No. 63/551,548 filed on Feb. 9, 2024 and titled Generation of Synthetic Data for PII, U.S. Provisional Patent Application Publication No. 63/602,675 filed on Nov. 27, 2023 and titled Targeted Catastrophic Forgetting for LLMs, and U.S. Provisional Patent Application No. 63/604,909 filed Dec. 1, 2023 and titled Guardian-Preventing Privacy Attacks on LLMs. The contents of these applications are incorporated herein by reference.

FIELD OF THE INVENTION

The present invention primarily relates to artificial intelligence and large language models (LLMs) for generative AI applications.

BACKGROUND

Large Language Models (LLMs) are generative Artificial Intelligence (AI) models which are trained on limited amounts of data and can perform language processing tasks (with multimodal inputs—text, and more recently, image inputs as in Microsoft's Kosmos-1) and generate human-like text (and associated multimedia material, like images, video and advertisements). LLMs have many parameters (from millions to billions). LLMs can capture complex patterns in language and produce text that closely resembles human language.

The high-level goal of an LLM is to predict the text (and other multimedia material) that is likely to come next in a sequence. The applicants recognize that LLMs are a type of generative AI that is in usually different from traditional machine learning and AI applications. LLM also stands for Learning with Limited Memory and implies that LLM's are closely tied to their training data and make decisions based on the limited amount of data. Both generative AI and LLM generate content, but LLM does it in a manner that improves computational and memory efficiency.

Traditional machine learning type algorithms focus on analysis, such as statistical regression or clustering, and are usually again different from Generative AI and LLMs, which focus on generating content. LLMs have immediate practical implication in generation of new content that matches associated or preceding/future content in an optimized manner, such as legal briefs or computer code, based on training with a limited amount of data, such as existing briefs or code, both from private and public sources. In this invention, we focus on LLM models as the primary focus of these improvements, though we do not disclaim other AI models, unless expressly done as part of the claims.

LLMs are created with complex architectures such as transformers, encoders and decoders. LLMs, typically, use a technique of natural language processing called Tokenization that involves splitting the input text (and images) and output texts into smaller units called tokens. Tokens can be words, characters, sub-words, or symbols, depending on the type and the size of the model. Tokenization helps to reduce the complexity of text data, making it easier for LLMs to process and understand data thus reducing the computational and memory costs. Another important component of an LLM is Embedding, which is a vector representation of the tokens. The Encoder, within the Transformer architecture, processes the input text and converts it into a sequence of vectors, called embeddings, that represent the meaning and context of each word. The Decoder, within the Transformer architecture, generates the output text by predicting the next word in the sequence, based on the embeddings and the previous words. LLMs use Attention mechanisms that allow the models to focus selectively on the most relevant parts of the input and output texts, depending on the context of the task at hand, thus capturing the long-range dependencies and relationships between words.

LLMs are designed to learn the complexity of the language by being pre-trained on vast amounts of text (and multimedia) data from sources such as Wikipedia, books, articles on the web, social media data and other sources. The training procedure can be decomposed into two stages:

1. Pre-training on a large amount of unlabeled plain text; and
2. Supervised fine-tuning Through training on limited amounts of data, the models are able to learn the statistical relationships between words, phrases, and sentences and other multimedia content. The trained models can then be used for generative AI applications such as Question Answering, Instruction Following, Inferencing, for instance, where an input is given to the model in the form of a prompt and the model is able to generate coherent and contextually relevant responses based on the query in the prompt.

Popular LLM models include GPT (Generative Pre-trained Transformer), BERT (Bidirectional Encoder Representations from Transformers), BART (Bidirectional and Auto-Regressive Transformers) and PaLM (Pathways Language Model). See, for example, public domain websites, such as openai.com or bard.google.com for more information as to how a person of ordinary skill in the art may use these models. Public domain and company-specific LLMs, such as GPT4AII, MiniGPT4, RMKV, BERT, MPT-7B, Kosmos-1 (which accepts image and multimodal inputs), YaLM, are also available for wide use, as for example, described in medium.datadriveninvestor.com/list-of-open-source-large-language-models-llms-4eac551bda2e.

Current AI generative models and LLMs require supercomputing efforts to compute results and an efficient way to improve response times, accuracies, and reduce computational load is required to improve both cost and scalability and expandability of existing AI models and their use.

Large neural network models (such as GPT-4, LLaMa, Mistral), trained on massive text corpora using self-supervised learning, have demonstrated impressive natural language capabilities. However, their extensive training datasets, scraped from public domain sources, inevitably incorporate sensitive personally identifiable information (PII) like names, locations, ID numbers that uniquely tie back to individual identities. Such inadvertent retention of PII within the learned parameters of generative language models poses ethical risks in terms of privacy violations as well as compliance challenges for deploying these models. While existing techniques aim to constrain inappropriate memorization during training through alignment strategies, directly extracting or modifying retained PII imprints in already deployed models remains non-trivial without extensive retraining or fine-tuning on completely fresh corpora. Hence, the critical unsolved problem is pioneering methodologies that can verifiably and minimally invasively erase specific PII imprints and encoded associative links already memorized within pretrained model parameters without requiring full model re-engineering or exhaustive retraining which can be computationally prohibitive. The solutions should be optimally targeted to erase only inappropriate PII retention while preserving expected beneficial language proficiencies.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for multi-level generative AI and large language models (LLM) for generative AI applications, that utilize the following techniques:

Derived Requests: An initial level of generative AI software program, or AI broker, evaluates the incoming client request (maybe a conversational query or through an API, such as OpenAI API) and identifies its specific AI "characteristics" that may make it suitable for one or other or both or multiple AI language models and checks its "derived requests" categories to see if the query suits one of the "derived requests" categories and/or it can or should create a new request.

Multiple h-LLMs: If the new request does is not assigned to one or more of the "derived requests) categories, it evaluates the request and selects one or more AI h-LLM model categories for its evaluation. An h-LLM is a family of models, such as GPT-4, that (in addition) have been trained according to a particular training set T1. A family of generative models, LLM1, trained with a data set T1, can be represented as h-LLM1, while a family of models, LLM2, trained with data set T2, can be represented as h-LLM12. Further, a family of models, LLM1, trained with a data set T3, can be represented as h-LLM35. The combination of models and their training sets (T1 could be a subset of T3, for example, or they can be different) may be used in our proposed invention and they are referred to as h-LLMs, throughout. A family of LLMs that operate at a lower arithmetic precision, on computer CPUs or graphical processing units (GPUs, such as Nvidia's H100), may also be called by a different identifier, e.g., h-LLM14, when trained with its corresponding data set.

Choosing h-LLMs with varying levels of accuracy: It further checks the workload of the AI h-LLM models in the one or more categories and its level of training and its accuracy—called its workload scores or its technical accuracy scores, or its business value metrics or a combination of these scores, and then assigns the request (or its derived form) to one or more of the AI h-LLM models within the selected AI h-LLM model categories.

Assigning weights to results: It then receives the results from the AI models in the AI h-LLM models categories and weights them to compute a result that could be returned to the requester program, or it could resend the request back to the AI h-LLM models/categories hierarchy till it reaches a certain level of service level assurance.

Use of Local Database: It also updates a local database with the results of the request's path through its hierarchy and create an index of "derived requests" that may be used in future to select which set of "derived requests" an incoming request may fall into for further processing.

Distributed Architecture: The tasks may be implemented as containers within Kubernetes environment and a service mesh, such as Istio, may be used to instrument and parameterize the metrics and log collections, but not limited to these cloud models for implementation.

Embodiments of the present invention are directed to a system and associated methods for unlearning PII associations already encoded within an existing trained language model. A targeted catastrophic forgetting (TCF) technique using Adversarial Fine-Tuning is described. This technique involves artificially generating synthetic PII data like names and emails that have maximally different statistical correlations compared to real PII distributions in the training data. This synthetic data is algorithmically crafted to confuse and interfere with the precise memorization capacities and gradients tied to real PII links. The synthetic adversarial PII data is then combined with samples of real PII requiring erasure into a blended dataset. This composite adversarial dataset is then used to incrementally fine-tune the language model in a multi-stage process with gradually descending learning rates. The controlled exposure interferes with only the specific gradients and parameters tuned to retain real PII, culminating in targeted catastrophic forgetting of factual PII links. The efficacy of PII erasure can be validated by testing failure to extract erased PII via prompts. Benchmarking evaluations before and after fine-tuning also verify minimal collateral impact on overall language quality. The approach strikes an optimal balance between precisely unlearning target PII and minimally disturbing unrelated language skills. Furthermore, this approach opens promising avenues toward imparting LLMs with trainable and targeted forgetfulness of inappropriate memorization, paving the path for more legally compliant, ethically aligned and dynamic LLMs that respect user privacy.

Embodiments of the present invention are directed towards a system and associated methods that leverage Conditional Generative Adversarial Networks (cGANs) to facilitate unlearning of information that it is desired to not be producible or extractable from an LLM, such as personally identifiable information (PII), copyrighted material, medical information, and other confidential or private information associations already encoded within an existing pre-trained LLM. This technique involves algorithmically synthesizing adversarial PII data samples (such as names, emails, and locations, or other confidential and/or private information) that are explicitly designed to have maximally divergent statistical correlations compared to the real PII distributions present in the LLM's original training data. The adversarial synthetic PII data is generated by a modified cGAN architecture comprising a generator network which is optimized through an adversarial objective function incorporating perplexity and extractability terms, in addition to an adversarial loss weighted by a utility function. The utility function assigns configurable and variable importance scores to different PII or confidential information fields, enabling control over the degree of divergence per field to preserve utility. A tunable adversarial parameter $\lambda$ balances the adversarial loss and cross-entropy loss, allowing adjustment of the degree of adversariality. The generator produces samples that intentionally collide with and degrade the LLM's ability to recall specific PII associations (or other confidential or paywalled information, such as copyrighted or pay-per-view information, for example) while maintaining plausibility to fool the discriminator. The generated adversarial synthetic data is then used to fine-tune the LLM, inducing targeted catastrophic forgetting of the embedded PII while minimizing collateral impact on broader capabilities.

BRIEF DESCRIPTION OF THE DRAWINGS

FIG. 12 is an illustration of the combining h-LLMs in series, according to an embodiment of the present invention.

FIG. 13 is an illustration of combining h-LLMs in parallel, according to an embodiment of the present invention.

FIG. 16 is an illustration of batch and real-time processing architecture for h-LLMs, according to an embodiment of the present invention.

FIG. 17 is an illustration of an in-memory processing architecture for h-LLMs, according to an embodiment of the present invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
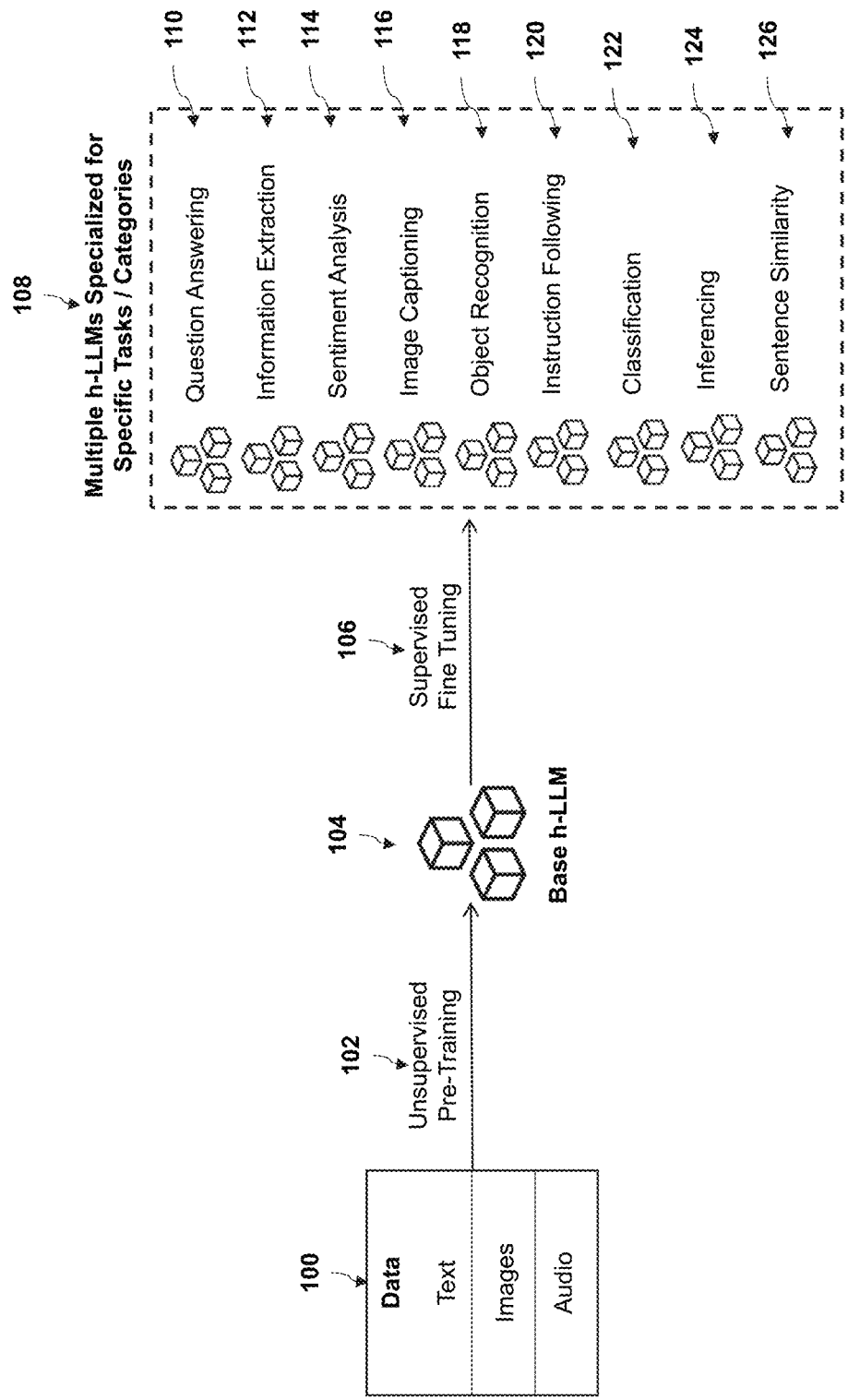
FIG. 1 is an illustration of the training process for creating multiple specialized large language models for specific tasks/categories, according to an embodiment of the present invention.

Referring now to FIG. 1 is an illustration of the training process for creating multiple specialized large language models for specific tasks/categories, is described in more detail. Data 100 (such as text, images, and audio) is used to pre-train a model in a process called unsupervised pre-training 102 which generates a base h-LLM model 104. The pre-training process is referred to as unsupervised as unlabeled data is used at this step. The base h-LLM model 104 is then fine-tuned in a process called supervised fine-tuning 106. The fine-tuning process uses smaller labeled data sets. The base h-LLM model 104 is fine-tuned to generate multiple h-LLM models which are specialized to perform specific tasks such as Question Answering, Information Extraction, Sentiment Analysis, Image Captioning, Object Recognition, Instruction Following, Classification, Inferencing, and Sentence Similarity, for instance.

Figure 2:
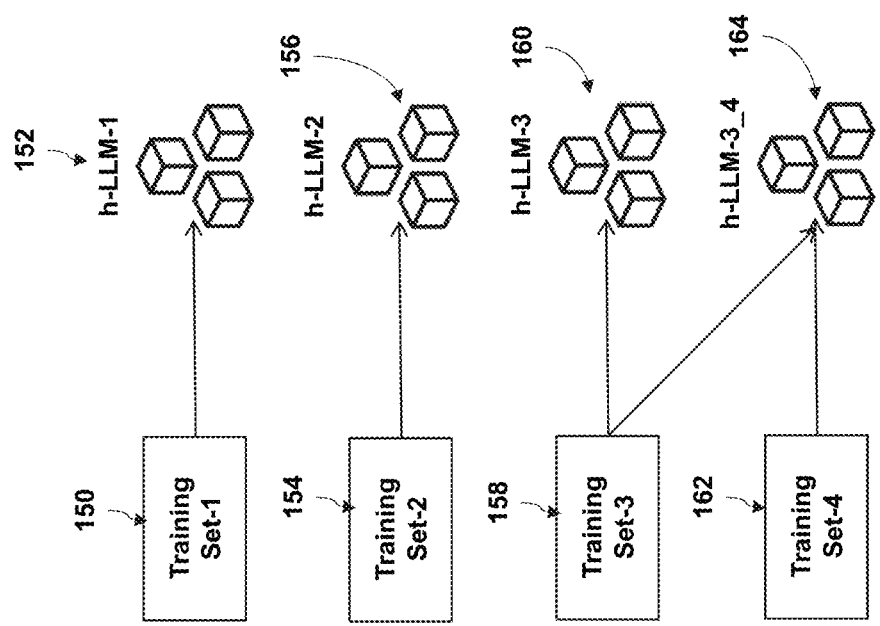
FIG. 2 is an illustration of h-LLMs trained with different training sets, according to an embodiment of the invention.

Referring now to FIG. 2 is an illustration of h-LLMs trained with different training sets, is described in more detail. As used in this specification h-LLM usually refers to a family of LLMs, such as those used in Google's Bard or OpenAI's GPT-4, that have been trained on a particular training set T. Therefore, the same family of LLMs (e.g., GPT) if trained on a different training set, T1, as opposed to GPT trained on training set T2 could be differentiated as a separate h-LLM). The training sets can be private within an organization or public datasets.

For example, as shown in FIG. 2, h-LLM-1 152 is trained with training set-1 150, h-LLM-2 156 is trained with training set-2 154, h-LLM-3 160 is trained with training set-3 158, and h-LLM-3_4 164 is trained with training set-3 158 and training set-4 162.

An h-LLM can be described as a combination of LLM families and the training dataset used as follows:

$$h-LLM = LLM \text{ family } (X) \text{ trained with Training Set}(Y)$$

Figure 3:
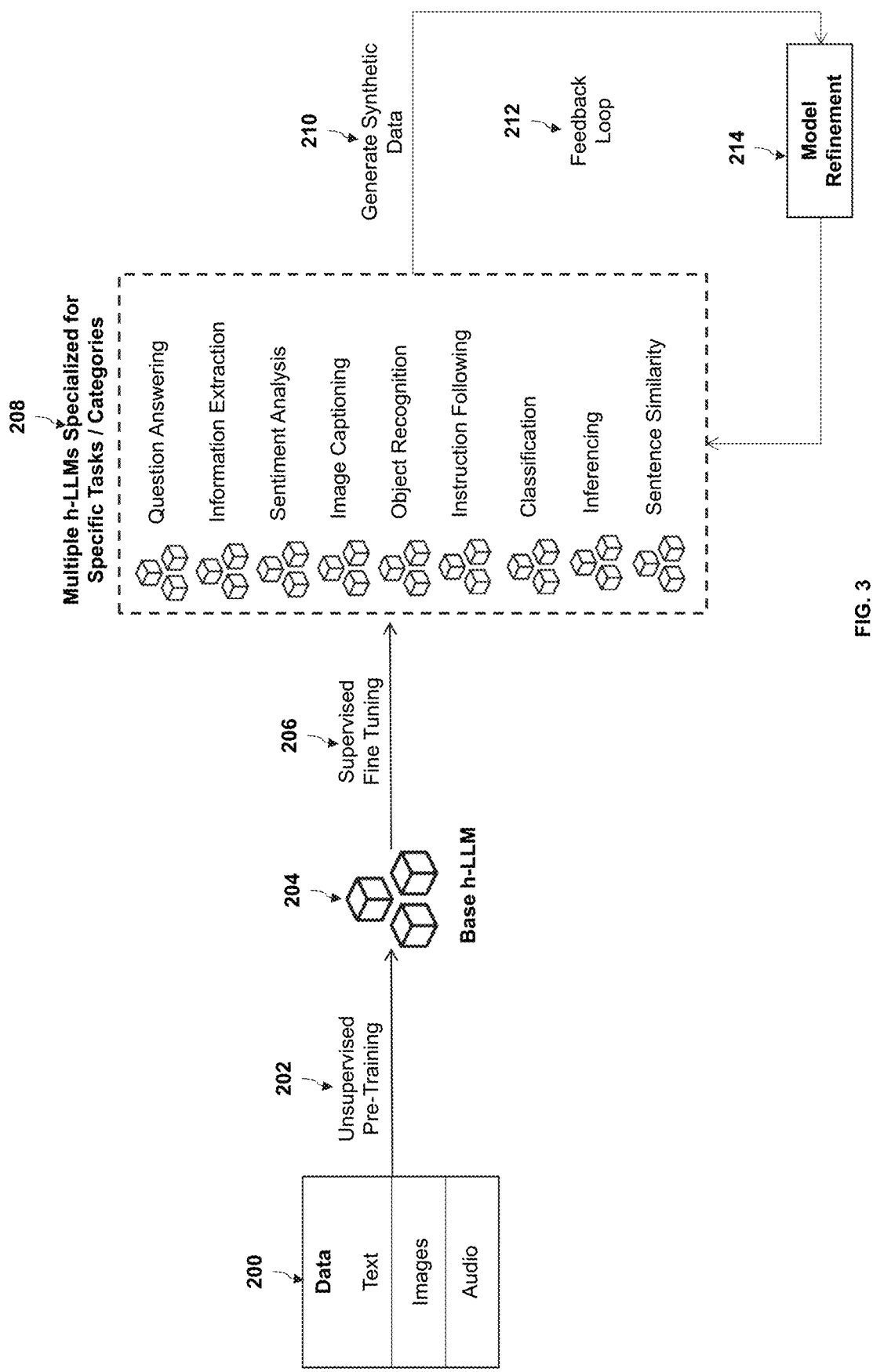
FIG. 3 is an illustration of the process for generating synthetic data from multiple h-LLMs and using it for model refinement, according to an embodiment of the invention.

For example, h-LLM_1=PaLM-2 may be trained with training set T12, h-LLM_2=PaLM-2 may be trained with training set T12+T45, h-LLM_3=GPT-4 may be trained with Training Set T65, and h-LLM_4=GPT-4 may be trained with ANY data set Referring now to FIG. 3, an illustration of the process for generating synthetic data from multiple h-LLMs and using it for model refinement, is described in more detail. Data 200 is used to train a base h-LLM model 204 using unsupervised pre-training 202 which is then fine-tuned in a supervised fine-tuning process 206 to generate multiple h-LLMs specialized for specific tasks or categories 208. Each of these h-LLMs 208 are used to generate synthetic data 210 which is then fed back to the models in feedback loop 212 through a process called model refinement 214.

Figure 4:
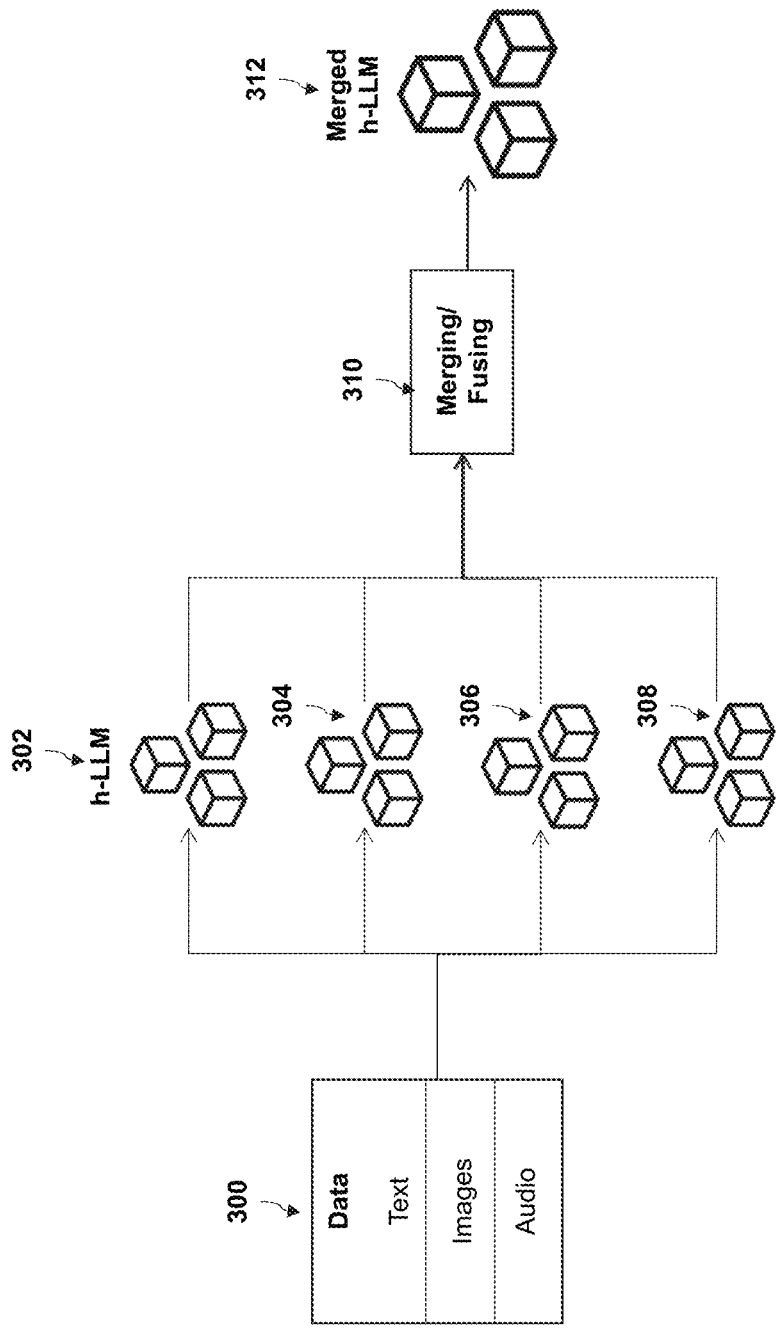
FIG. 4 is an illustration of a "bagging" approach where multiple h-LLMs with lower precision and accuracy are merged/fused to create a merged h-LLM with higher precision and accuracy, according to an embodiment of the invention.

Referring now to FIG. 4 is an illustration of a bagging approach, that has some similarity to what was originally used in the context of machine learning models in a different way (for analytics as opposed to generative AI applications, such as LLMs) that are described in this invention, where multiple h-LLMs with lower precision and accuracy are merged/fused to create a merged h-LLM with higher precision and accuracy, is described in more detail. Bagging is a machine learning technique which improves the stability and accuracy of machine learning models. Using the input data 300, multiple subsets of the data are created which are used to train multiple h-LLMs (302, 304, 306, 308) in parallel. These models are then combined in a process called merging or fusing 310 to create a merged h-LLM 312.

Figure 5:
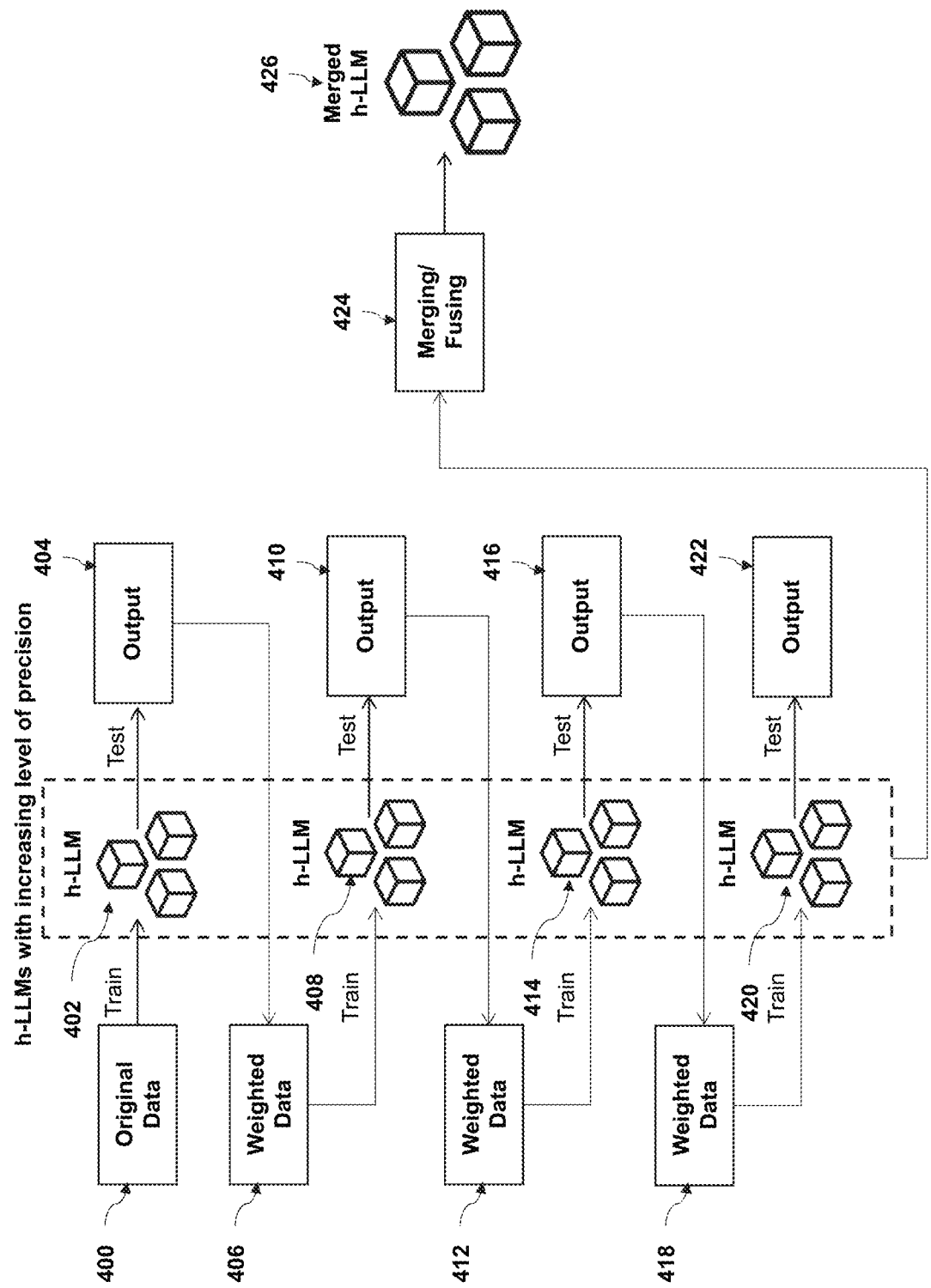
FIG. 5 is an illustration of a "boosting" approach where multiple h-LLMs of increasing precision and accuracy are created in a sequential manner and then merged/fused to create a merged h-LLM, according to an embodiment of the invention.

Referring now to FIG. 5 is an illustration a boosting approach, that has some similarities to that originally used in the context of machine learning models in a different way (for analytics as opposed to generative AI applications used in this invention) where multiple h-LLMs of increasing precision and accuracy are created in a sequential manner and then merged/fused to create a merged h-LLM, is described in more detail. Boosting is a machine learning technique that involves creating a stronger and more accurate model from a number of weaker models. The original data 400 is used to train an h-LLM 402. The h-LLM 402 is tested and the output 404 is assigned weights to generate weighted data 406. The weighted data 406 is then used to train h-LLM 408. The same process is then repeated and h-LLMs 414 and 420 are generated in a sequence. The h-LLMs 402, 408, 414 and 420 are then combined in a process called merging or fusing 424 to create a merged h-LLM 426.

Figure 6:
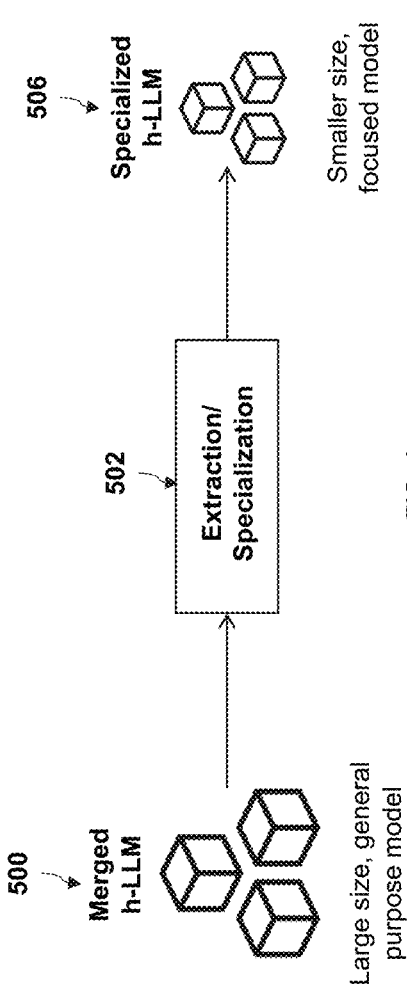
FIG. 6 is an illustration of creating a smaller and more specialized h-LLM through extraction/specialization process from a larger h-LLM, according to an embodiment of the invention.

Referring now to FIG. 6 is an illustration of creating a smaller and more specialized h-LLM through extraction/specialization process from a larger h-LLM, is described in more detail. The extraction/specialization process 502 extracts the specific knowledge required for a task from a big, general-purpose model, and creates a smaller h-LLM 506. For example, a specific task can be sentiment analysis of input text, for which a smaller model 506 is more efficient as compared to a large, general-purpose model.

Figure 7:
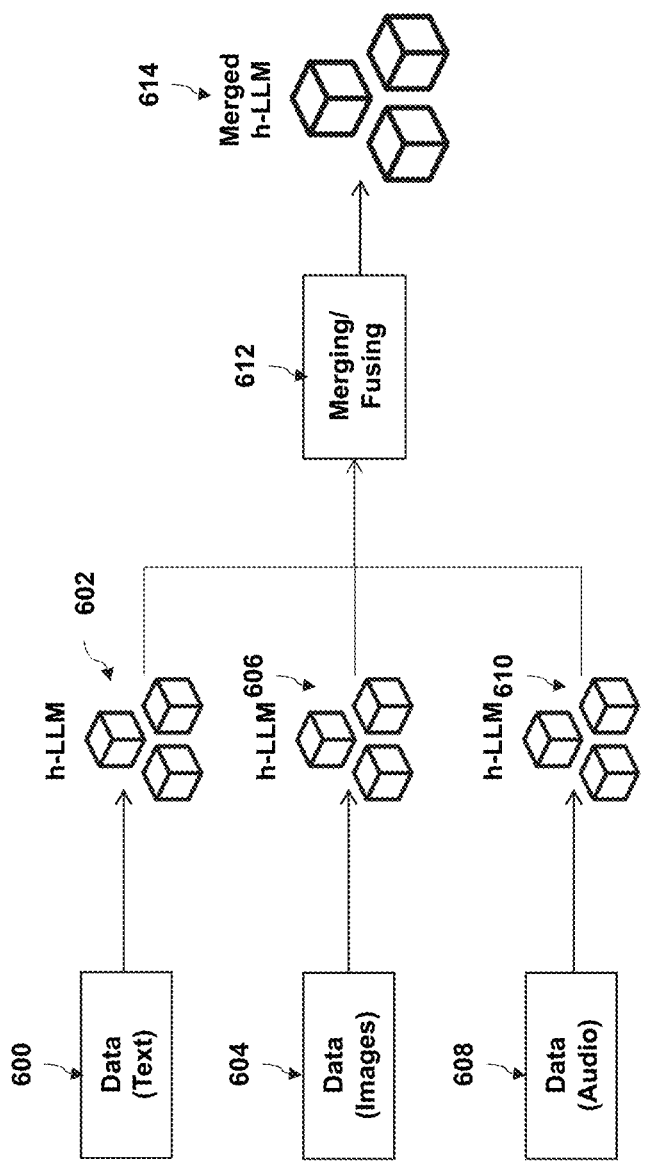
FIG. 7 is an illustration of combining h-LLMs trained with text, image and audio data to create a merged h-LLM, according to an embodiment of the invention.

Referring now to FIG. 7 is an illustration of combining h-LLMs trained with text, image and audio data to create a merged h-LLM, is described in more detail. Text data 600 is used to train h-LLM 602, image data 604 is used to train h-LLM 606 and audio data 608 is used to train h-LLM 610. The h-LLMs 602, 604, 608 are combined in a process called merging/fusing to create a merged h-LLM 614.

Figure 8:
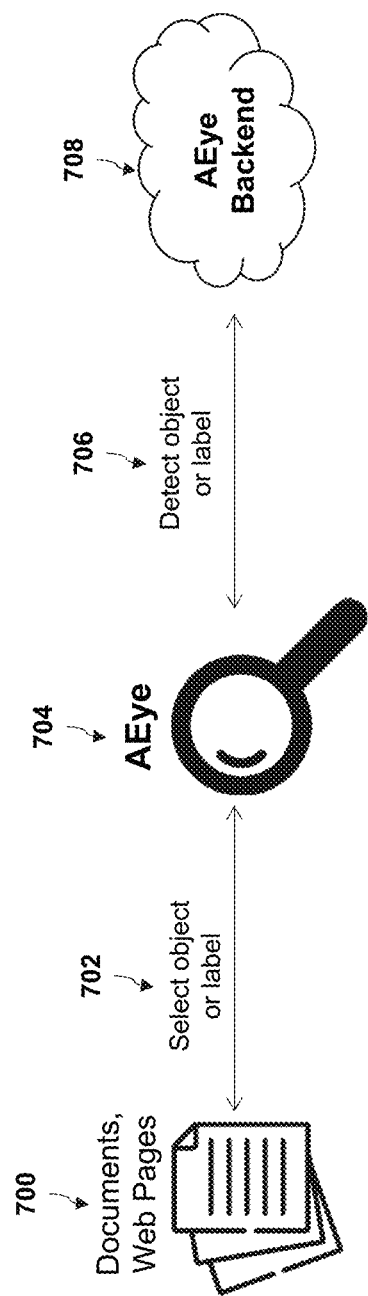
FIG. 8 is an exemplary illustration of an application of using AI models for detecting labels in PDF files, according to an embodiment of the invention.

Referring now to FIG. 8 is an exemplary illustration of an application of using AI models for detecting labels in PDF files, is described in more detail. Patent documents (such as PDF files) have figures in which various entities/blocks/items are labeled using numeric labels (for instance 110, 120 and so on). These labels are referenced and described in the patent text specification. When reviewing multiple documents, readers find it difficult to quickly lookup the labels mentioned in the figures (and what they refer to) from the text, as they need to go back and forth between a figure and the text in the specification. A novel PDF Label search solution is offered within CatchUp which allows quick lookup of labels in a figure using an innovative "AI Magnifier" approach. The user can select one or more labels using the Magnifier tool in the CatchUp GlassViewer (a PDF viewer tool within CatchUp that has annotation and other AI features). When one or more labels are selected using the Magnifier tool, the labels are searched within the PDF and the search results are returned. The PDF Label Search tool is built upon a novel AI Magnifier technology (which we refer to as AEye). AEye serves as a gateway to the world of Artificial Intelligence (AI) for documents and web pages. AEye can be used for a wide range of applications such as detecting objects in images, labels in documents, for instance. Documents or web pages 700 can be searched using an AEye application 704 which detects objects or labels utilizing an AEye backend 708.

Figure 9:
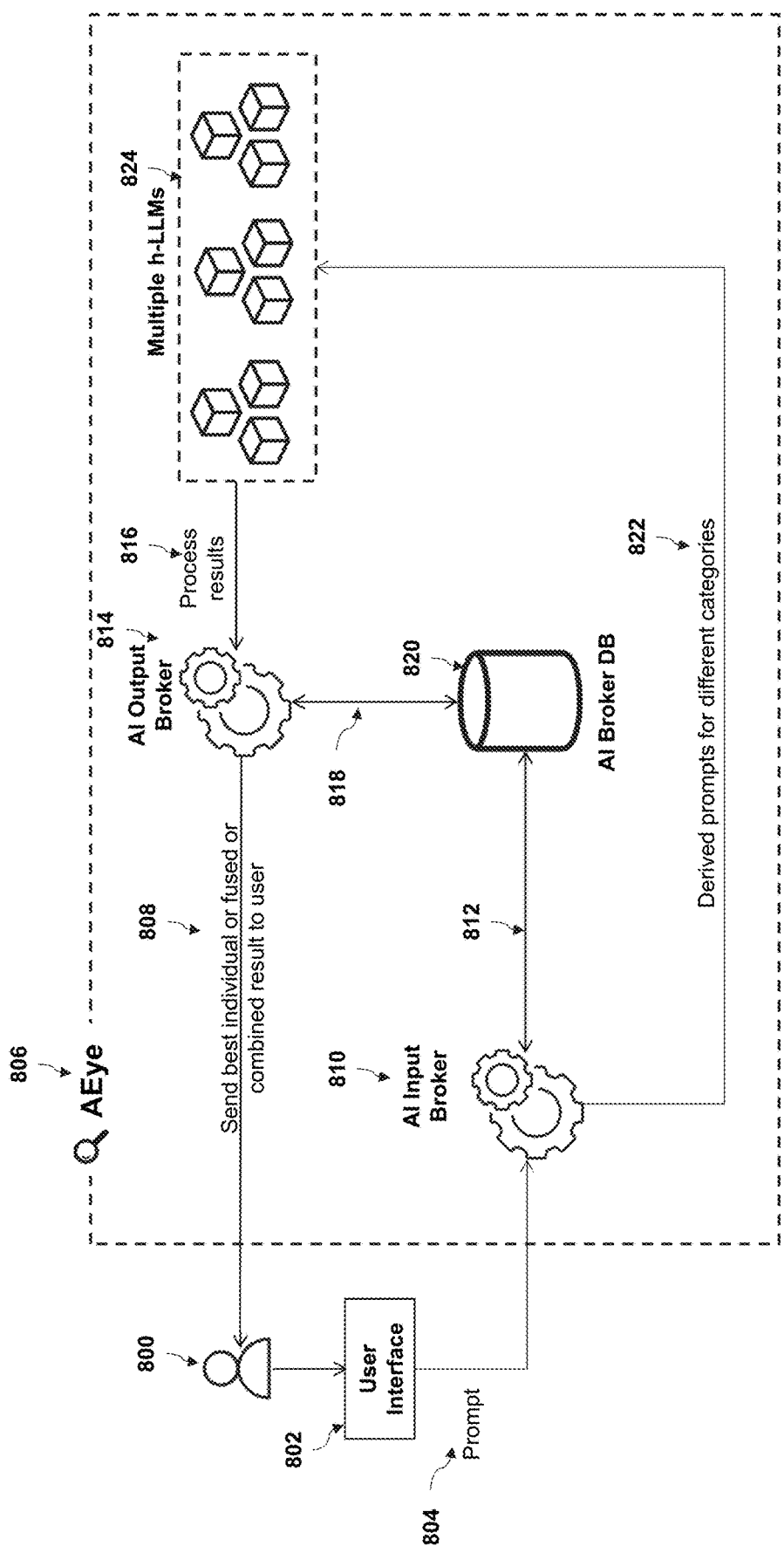
FIG. 9 is an illustration of generating derived prompts for different categories and using them with multiple h-LLMs to generate the best results, according to an embodiment of the present invention.

Referring now to FIG. 9 is an illustration of generating derived prompts for different categories and using them with multiple h-LLMs to generate the best results, is described in more detail. User 800 enters a prompt in user interface 802. The prompt is sent to the AI Input Broker 810 which generates multiple derived prompts for different categories. The derived prompts 822 are sent multiple h-LLMs 824 which produce the results. The results 816 are sent to the AI Output Broker 814 which processes the results and performs tasks such as filtering, ranking, weighting, assigning priorities, and then sends the best results to the user 800. The h-LLMs 824 can have varying levels of accuracy, and optimized for different tasks such as Question Answering, Information Extraction, Sentiment Analysis, Image Captioning, Object Recognition, Instruction Following, Classification, Inferencing, and Sentence Similarity, for instance. The AI Output Broker 814 computes various scores and assigns weights for ranking the results. The results may be sent back to the h-LLMs till a certain level of accuracy or service level assurance is reached. The AI Input Broker 810 and Output Broker 814 update 812, 818 a local AI Broker Database 820 with the results of the request's path through its hierarchy and create an index of "derived requests" that may be used in future to select which set of "derived requests" an incoming request may fall into for further processing.

Figure 10:
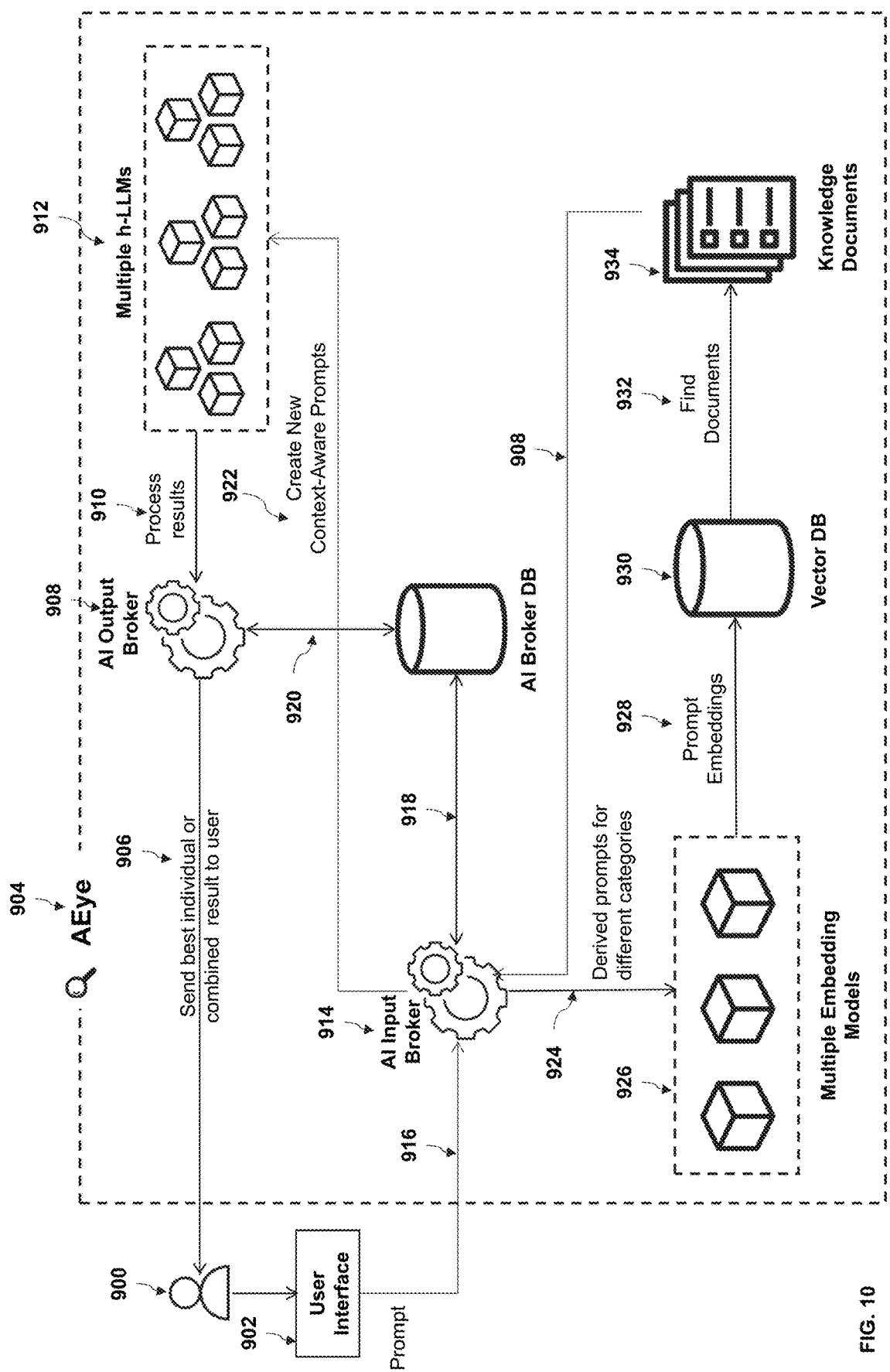
FIG. 10 is an illustration of using multiple h-LLMs to answer questions from specific input documents, according to an embodiment of the present invention.

Referring now to FIG. 10 is an illustration of using multiple h-LLMs to answer questions from specific input documents, is described in more detail. User 900 enters a prompt in user interface 902. The prompt is sent to AI Input Broker 810 which generates multiple derived prompts for different categories 924. The prompts are converted into embeddings using multiple embedding models 926. The prompt embeddings 928 are sent to a vector database 930 which returns a list of knowledge documents 934 that are relevant to the prompt based on the similarity of their embeddings to the user's prompt. The knowledge documents 934 are sent to the AI Input Broker 810 which creates new context-aware prompts based on the user's initial prompt 916, derived prompts 924 and the retrieved knowledge documents 934 as context and sends it to multiple h-LLMs 912. The results produced by multiple h-LLMs are processed by the AI Output Broker 908 and the best result is sent to the user 900 along with citations from the knowledge documents 934.

Figure 11:
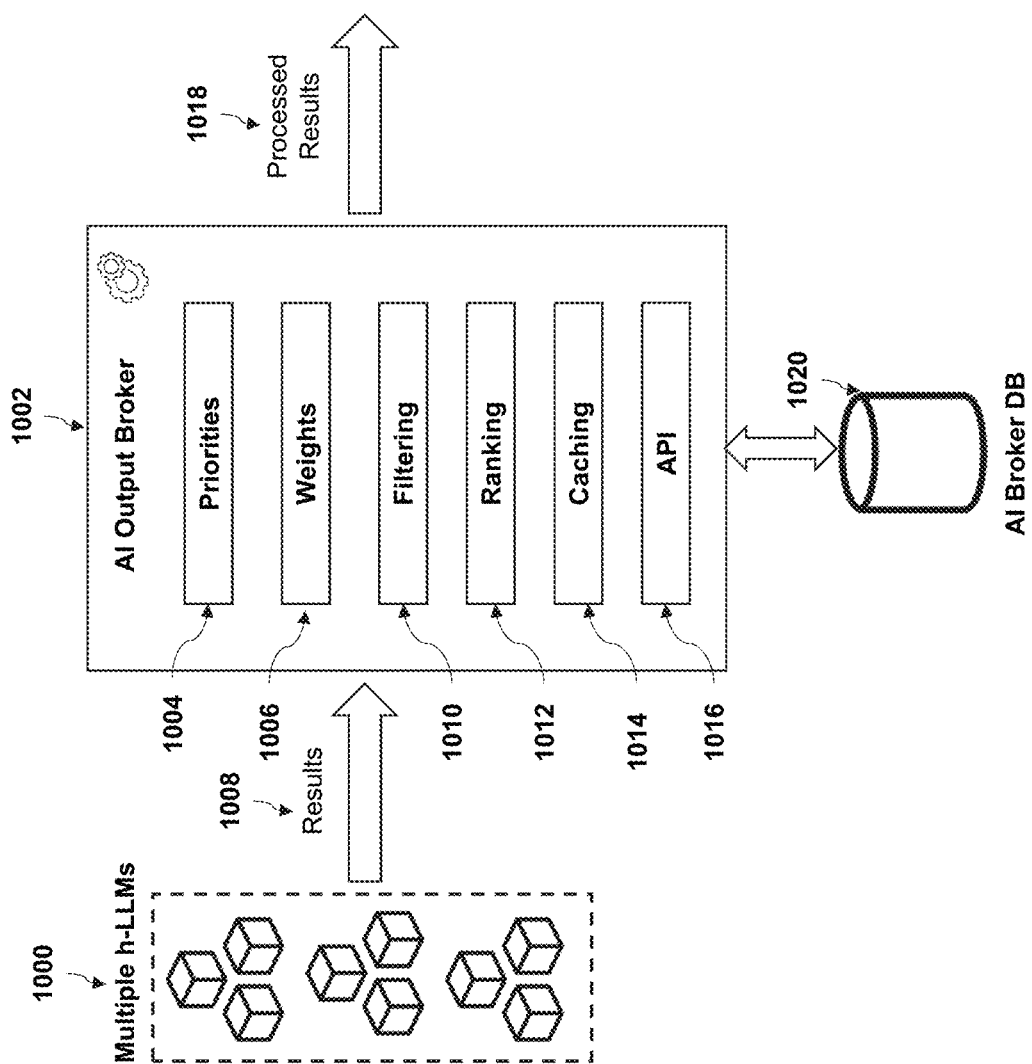
FIG. 11 is an illustration of an AI Broker for processing results from multiple h-LLMs, according to an embodiment of the present invention.

Referring now to FIG. 11 is an illustration of an AI Broker for processing results from multiple h-LLMs, is described in more detail. Results produced by multiple h-LLMs 1000 are sent to an AI Output Broker 1002 which performs tasks such as assigning priorities 1004 and weights 1006 to the results, filtering 1010, ranking 1012 and caching 1014. The AI Output Broker 1002 provides an API interface 1016 for configuring and managing various aspects of the broker. An AI Broker Database 1020 stores the results along with the meta-data information such as the request path. AI Broker Database 1020 creates an index of "derived requests" that may be used in future to select which set of "derived requests" an incoming request may fall into for further processing.

Referring now to FIG. 12 is an illustration of the combining h-LLMs in series, is described in more detail. User 1100 enters a prompt in user interface 1102. The prompt 1104 is sent to an AI Input Broker 1106 which generates a derived prompt by adding more contextual information. The derived prompt is sent to multiple h-LLMs 1108 connected in series. The derived prompt goes to the first h-LLM in the sequence which generates results. The results of the first h-LLM are sent to the second h-LLM in the sequence for refinement/enhancement and then to the third h-LLM and so on. The AI Output Broker 1110 processes the results 1112 and sends the processed results to user 1200.

Referring now to FIG. 13 is an illustration of combining h-LLMs in parallel, is described in more detail. User 1200 enters a prompt in user interface 1202. The prompt 1204 is sent to an AI Input Broker 1206 which generates multiple derived prompts by adding more contextual information. The derived prompts are sent to multiple h-LLMs 1208 which process the prompt in parallel generating multiple results. The AI Output Broker 1210 processes the results and sends the processed results 1212 to the user 1200.

Figure 14:
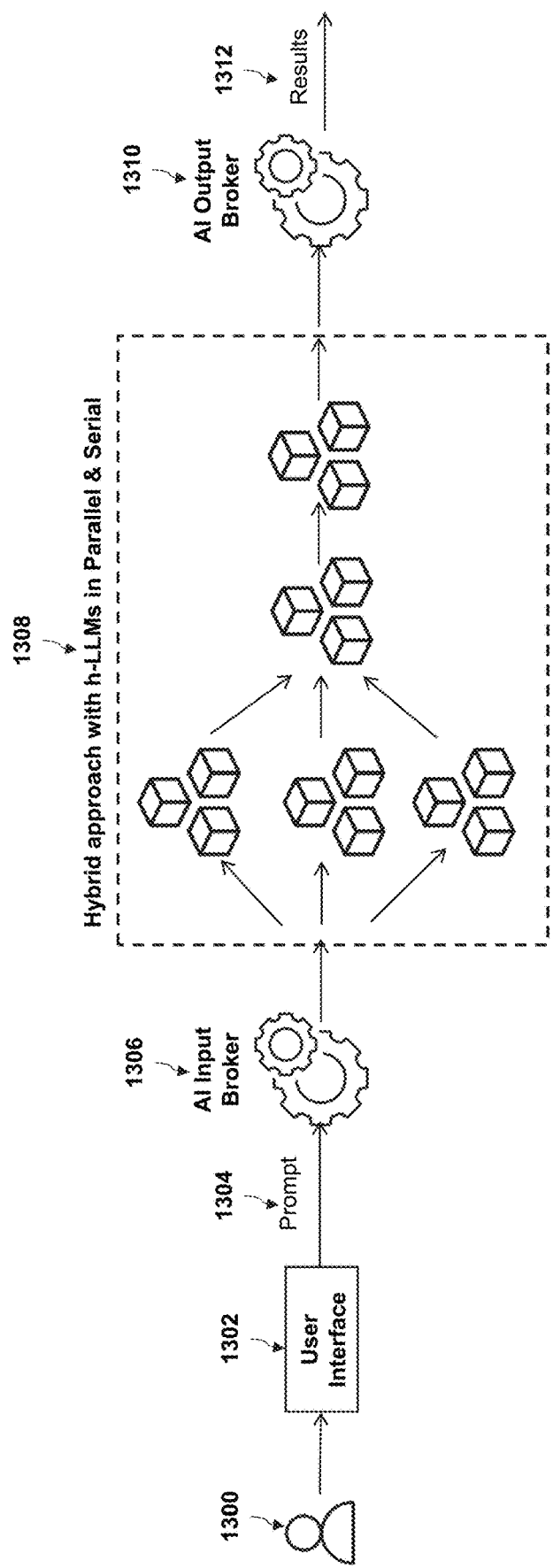
FIG. 14 is an illustration of a hybrid approach of combining h-LLMs in series and parallel, according to an embodiment of the present invention.

Referring now to FIG. 14 is an illustration of a hybrid approach of combining h-LLM in series and parallel, is described in more detail. User 1300 enters a prompt in user interface 1302. The prompt 1304 is sent to an AI Input Broker 1306 which generates multiple derived prompts by adding more contextual information. The derived prompts are sent to multiple h-LLMs 1308 which processes the prompts generating one or more results. The AI Output Broker 1310 processes the results and sends the processed results 1312 to the user 1300.

Figure 15:
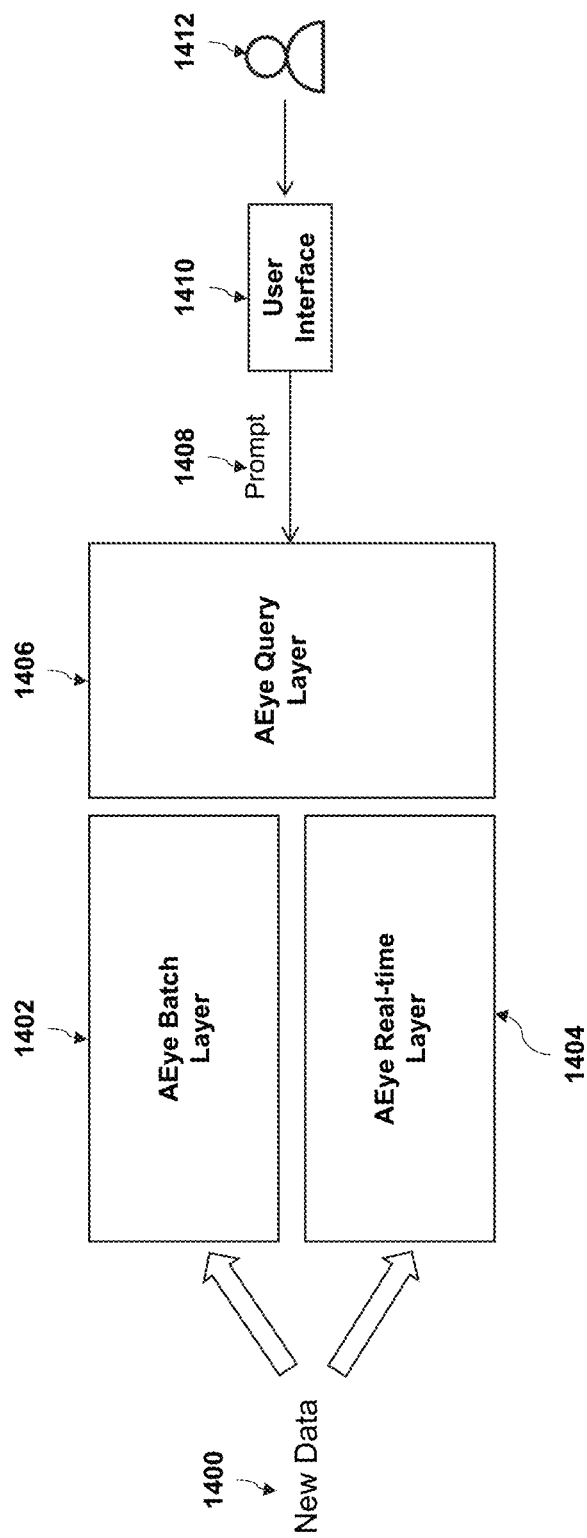
FIG. 15 is an illustration of the lambda architecture for h-LLMs, according to an embodiment of the present invention.

Referring now to FIG. 15 is an illustration of the lambda architecture for h-LLMs, is described in more detail. Lambda architecture is a way of processing massive quantities of data that provides access to batch-processing and stream-processing methods with a hybrid approach, often utilizing in-memory storage instead of disks for speedier processing. Such in-memory processing may be accomplished using a volatile memory device such as random-access memory (RAM) devices, static random-access memory (SRAM) devices, dynamics random-access memory (DRAM) devices, magnetoresistive random-access memory (MRAM) devices, and the like, or a non-volatile random-access memory (NVRAM) device. Such processing may be done partially or entirely in-memory.

This figure illustrates a lambda architecture for h-LLMs comprising batch layer 1402, real-time layer 1404 and a query layer 1406. New input data 1400 comes in continuously and is fed to the batch layer 1402 and real-time layer 1404 simultaneously. The batch layer 1402 maintains one or more h-LLMs which are updated/fine-tuned with the new data on a fixed schedule. Data is aggregated from the new input data 1400 over an aggregation duration that is tied to the fixed schedule. The real-time layer 1404 deals only with recent data which is not processed in the batch layer. The real-time layer 1404 maintains and updates smaller h-LLMs with incremental updates. The real-time layer 1404, also utilizes Map Reduce type analytics and computing and processing (See for example, tutorialspoint.com/map_reduce/map_reduce_introduction.htm) of tokens in the tokenization processes to improve speeds by which tokens are merged or otherwise aggregated in a distributed GPU computing environment, User 1412 sends a prompt 1408 through user interface 1410 to the query layer 1406. The query layer 1406 forwards the original prompt or creates one or more derived prompts which are sent to the batch and real-time layers. The query layer receives the results from the batch and real-time layers and performs tasks such as combining, ranking, filtering, assigning weights and priorities to the results and sends the best results to the user.

Referring now to FIG. 16 is an illustration of batch and real-time processing architecture for h-LLMs, is described in more detail. The input data stream 1500 is sent to batch layer 1506 and real-time layer 1526. The batch layer 1506 maintains a base h-LLM 1502 which is fine tuned 1504 in batch to generate fine-tuned h-LLM 1508. The real-time layer 1526 generates smaller h-LLMs with incremental updates 1514 in real-time increments 1512. The merger block 1516 combines and merges the h-LLMs from the batch layer and real-time layer to produce a combined h-LLM. The merged h-LLM is used with the query layer 1518 to respond to prompts 1520 sent by user 1524 through the user interface 1522.

Referring now to FIG. 17, an illustration of an in-memory processing architecture for h-LLMs, is described in more detail. The input data stream 1600 is sent to the data receiver 1602 which breaks the data into small batches 1604 which can be processed at least partially, and in some embodiments entirely, in-memory. The processing layer 1606 includes multiple h-LLMs which process the batches on input data and produce the batches of processed data 1608. Such batches may be produced after aggregating data from the input data stream 1600 over an aggregation duration.

Figure 18:
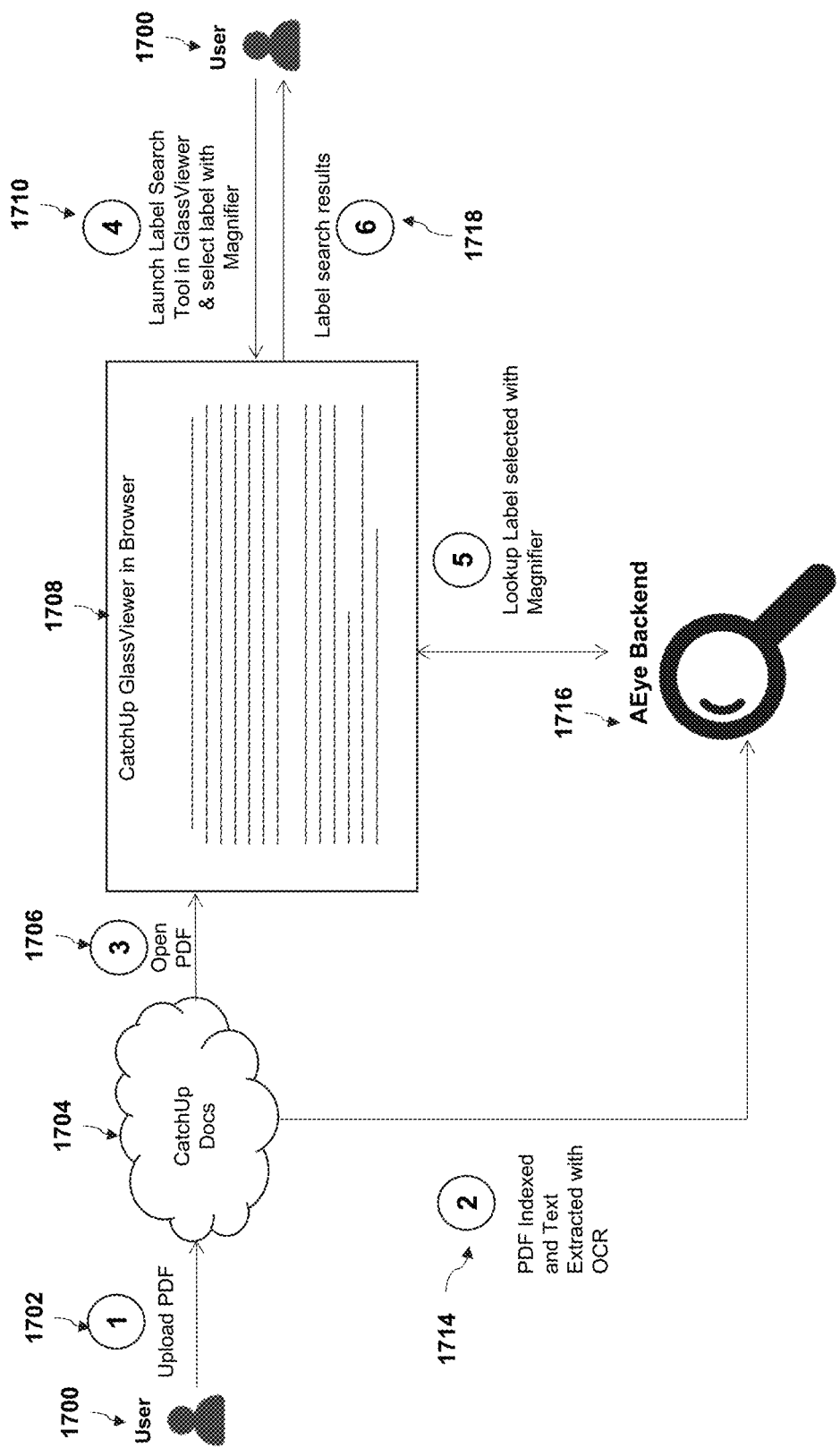
FIG. 18 is an illustration of the architecture of PDF label search tool with CatchUp GlassViewer, according to an embodiment of the invention.

Referring now to FIG. 18 is an illustration of the architecture of PDF label search tool with CatchUp GlassViewer, is described in more detail. User 1700 uploads a PDF document 1702 to the CatchUp document management system 1704. The text of the PDF document is extracted and indexed 1714 in the AEye backend system 1716. Such extraction and indexing may be performed using character recognition analysis, including optical character recognition analysis. The user opens the PDF document 1706 with the CatchUp GlassViewer application 1708 in a browser. User 1700 launches the label search tool 1710 within the CatchUp GlassViewer application 1708 and selects a label using the magnifier tool. The selected label is sent to the AEye backend system 1716 which retrieves and returns 1718 all occurrences of the label.

Figure 19:
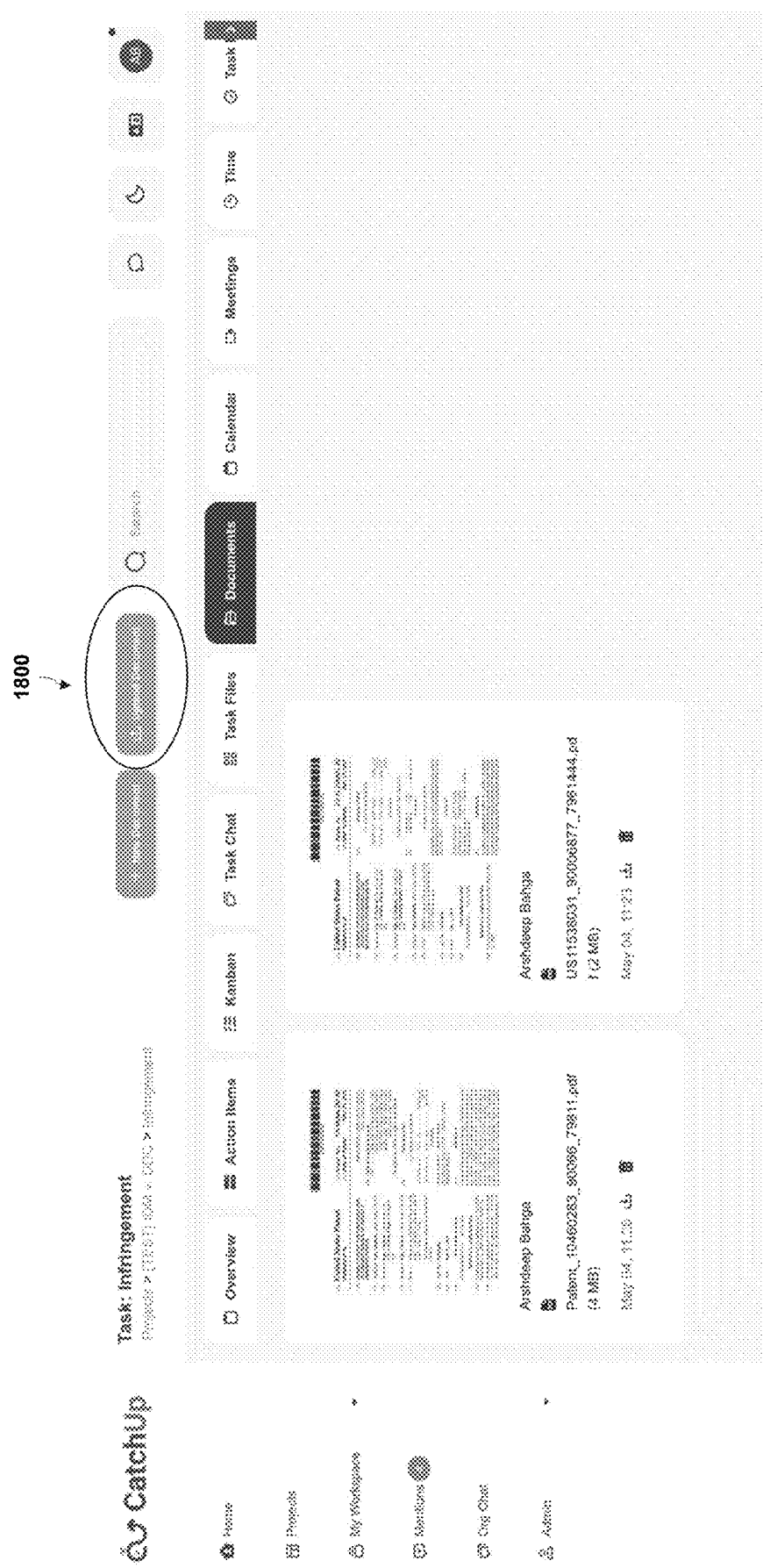
FIG. 19 is an exemplary interface of the CatchUp platform showing the document management system, according to an embodiment of the invention.

Referring now to FIG. 19 is an exemplary interface 1800 of the CatchUp platform showing the document management system, is described in more detail. Within this interface users can create new documents, upload existing documents, view and edit the documents.

Figure 20:
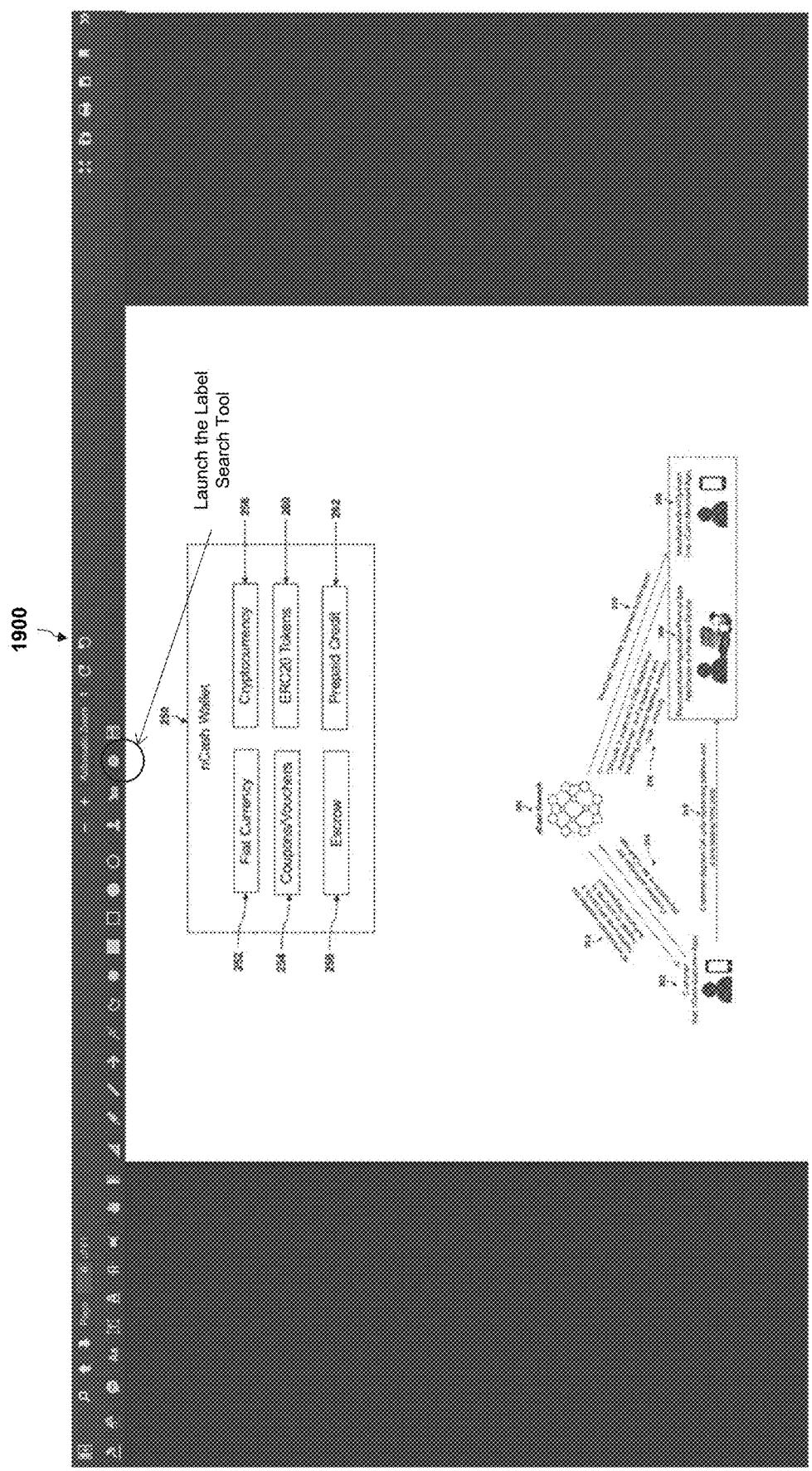
FIG. 20 is an exemplary interface of the CatchUp platform showing the PDF viewer (GlassViewer), according to an embodiment of the invention.

Referring now to FIG. 20 is an exemplary interface 1900 of the CatchUp platform showing the PDF viewer (GlassViewer), is described in more detail. GlassViewer is a PDF viewer application with CatchUp that allows annotating and commenting PDF files. The annotations and comments are stored in a separate layer which is rendered above the PDF document.

Figure 21:
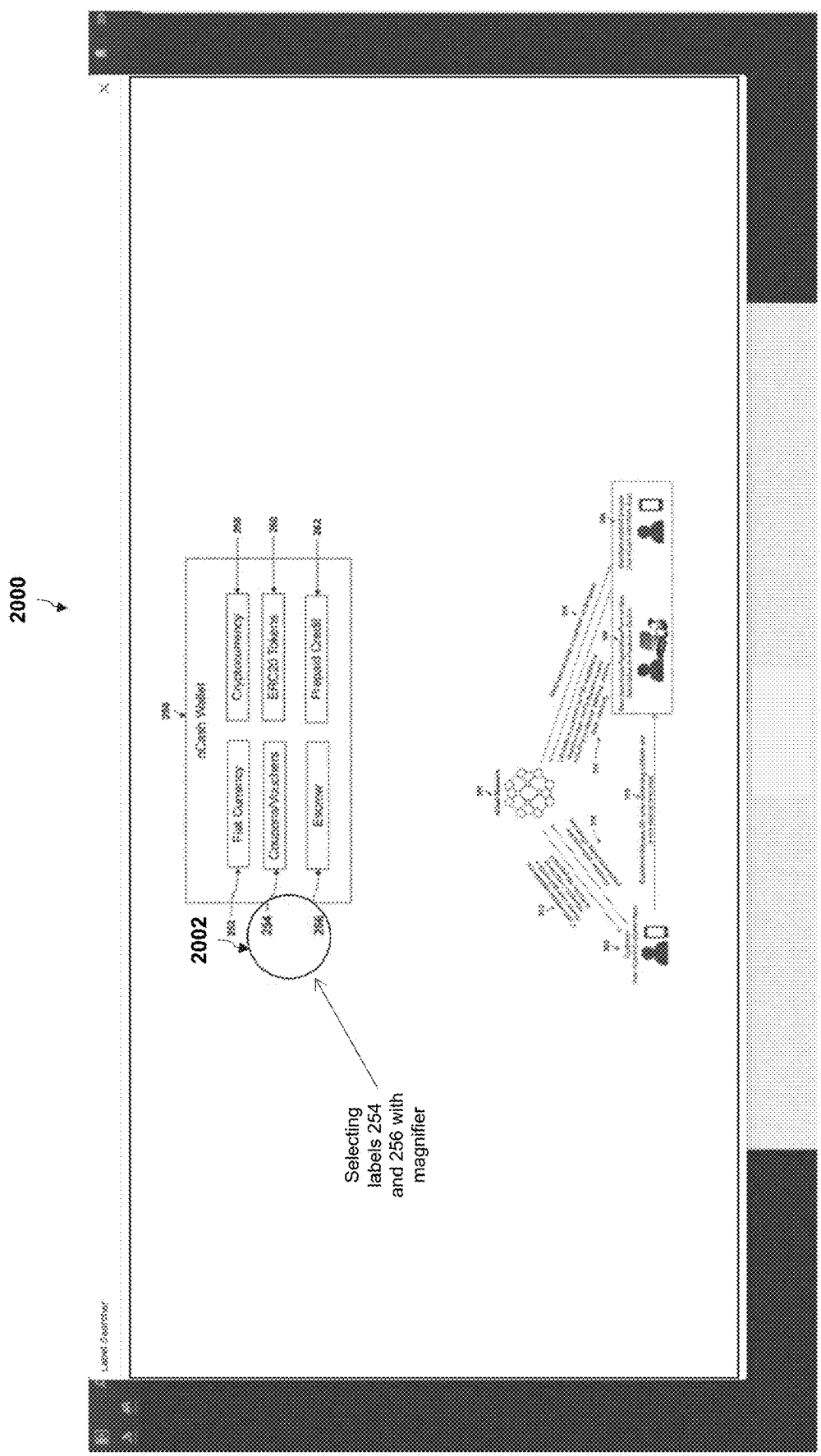
FIG. 21 is an exemplary interface of the CatchUp platform showing a magnifier tool within the GlassViewer for searching labels, according to an embodiment of the invention.

Referring now to FIG. 21 is an exemplary interface 2000 of the CatchUp platform showing a magnifier tool 2002 within the GlassViewer for searching labels, is described in more detail. GlassViewer includes a PDF label searching tool called AEye Label Searcher that allows quickly searching for all occurrences of selected labels within the PDF. AEye Label Searcher uses a magnifier to select specific labels within a region of the PDF which are sent to the AEye backend for processing, and the results are then displayed, which include excerpts from the document where the labels are mentioned. In some embodiments, the AEye backend may lookup labels within multiple documents or return additional information generated from one or more h-LLM models as taught elsewhere in other embodiments of this invention. For example, a legal brief may be first generated using a local (in-house) database of briefs and then supplemented by h-LLMs that are trained on public-domain training sets of legal briefs, and the combination may be merged as needed.

Figure 22:
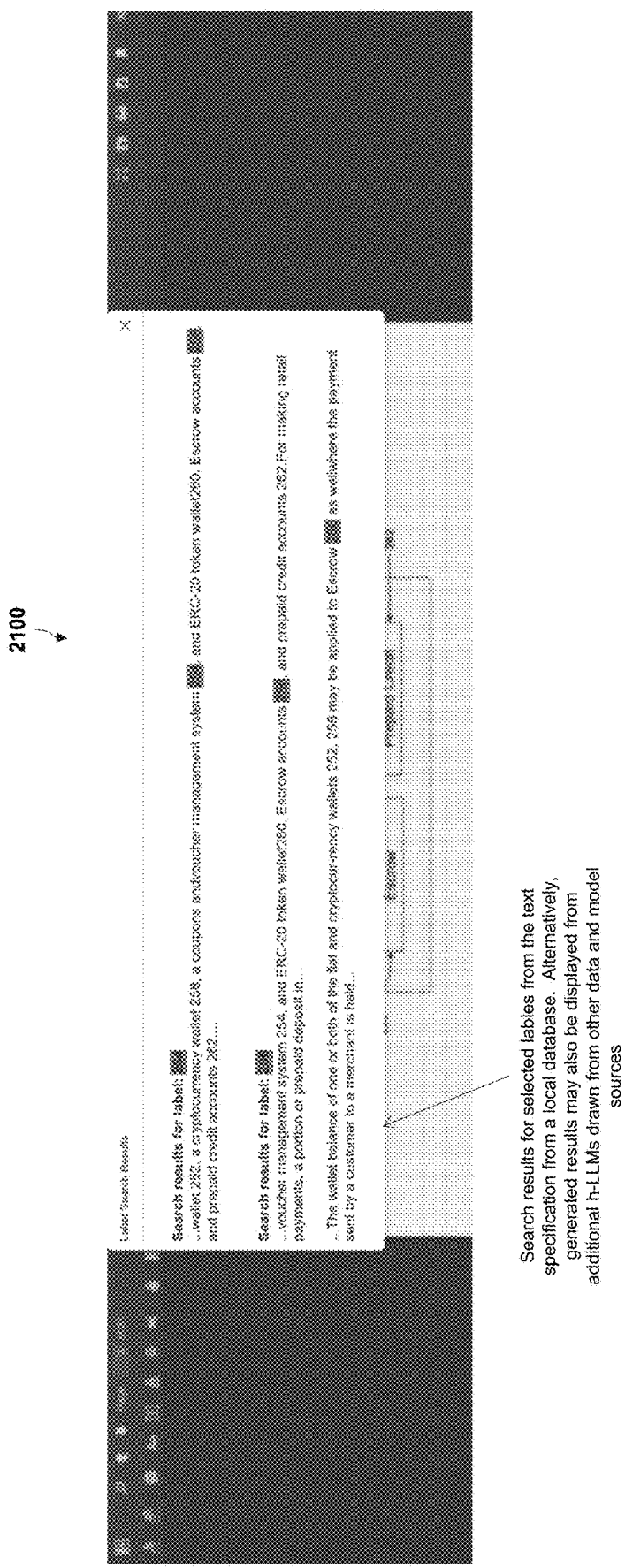
FIG. 22 is an exemplary interface of the CatchUp platform showing label search results within GlassViewer, according to an embodiment of the invention.

Referring now to FIG. 22 is an exemplary interface of the CatchUp platform showing label search results within GlassViewer, is described in more detail. The labels selected using the magnifier within the AEye Label Searcher are sent to the AEye backend for processing and the results are then displayed as shown in this figure.

Figure 23:
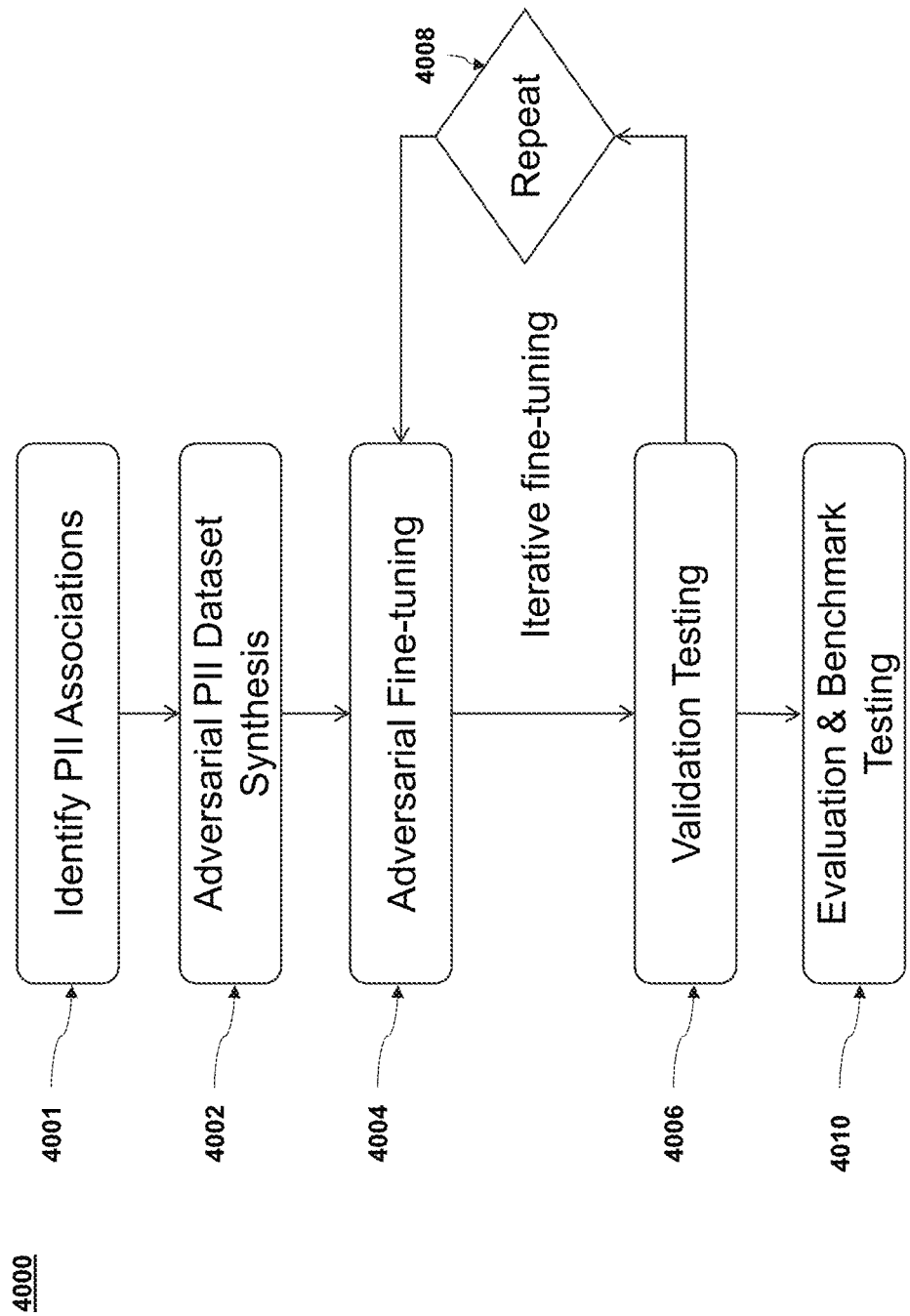
FIG. 23 is a flow chart illustrating a method of performing TCF using an adversarial data fine-tuning technique, according to an embodiment of the invention.

Referring now to FIG. 23, a flow chart of the steps involved in Adversarial Data Fine-tuning technique is described in more detail. The Adversarial Data Fine-tuning technique is designed for unlearning PII associations already encoded within an existing trained large language model (LLM), which may only be available as a black box. The entire flow is geared toward precisely unlearning target PII associations. Large language models tend to inadvertently memorize personally identifiable information (PII) like emails and locations during training. This approach offers a way to make models "unlearn" specific embedded PII without extensive retraining. It works by algorithmically generating synthetic PII data with adversarial correlations that maximize interference with real PII memorization. The key intuition is to strategically corrupt the PII distribution via adversarial synthetic data that collides with gradients needed to retain real PII, ultimately culminating in targeted catastrophic forgetting (TCF) of target PII links. While PII is specifically mentioned, it is contemplated and included within the scope of the invention that any type of unauthorized data may be trained out of an LLM using TCF, including, but not limited to, PII, financial information, copyrighted content, access-restricted content (for example, content which resides behind a paywall or otherwise requires a license or subscription to access), or any other type of data that may not be authorized for use in training the LLM, hereinafter referred to as unauthorized data (UD).

Referring now to FIG. 23, a method 4000 of implementing the TCF technique using adversarial data fine-tuning is presented. The TCF technique using adversarial data fine-tuning as implemented in method 4000 is designed to strike a balance between erasing specific PII while minimizing negative impact on overall LLM quality.

The method 4000 may comprise identifying PII Associations in the training data set for an LLM at step 4001. This step 4001 may include identifying individual unauthorized data instances within the training data, which for PII may be understood as identifiers. Types of identifiers may include, but are not limited to, names, emails, IDs and other sensitive data from LLM training data that need to be forgotten. The step 4001 may further include capturing associations between identifiers & PII. The identifiers and the PII associations may be organized as identifier-PII association pairs, more generally UD instance-UD association pairs. Such UD associations may comprise one or more of text data, image data, audio data, and/or video data.

The method may continue at 4002 with synthesizing an adversarial PII dataset. The step 4002 may include algorithmically generating synthetic identifier-PII association pairs, more generally synthetic UD instance-UD association pairs. An example identifier-PII association may be a name-email pair. The synthetic pairs may be configured specifically to reduce or remove the influence of the identified identifier-PII associations on the output of the LLM trained on the training data. More specifically, a first synthetic pair may be configured to reduce or remove the influence of a specific "real" pair comprised by the training data on the LLM. The synthetic pairs may be configured to have maximally alter identifier-PII correlations and gradients compared to the real PII distribution and maximally collide with the influence the real identifier-PII pairs have on the LLM. More generally, synthetic UD instance-UD association pairs are generated algorithmically to have maximally different statistical correlations compared to distributions of UD associations of the one or more UD associations in the training data. The synthetic pairs may be combined with the real PII pairs.

The method 4000 may continue at step 4004 with fine-tuning the LLM with the adversarial dataset assembled in step 4002. The LLM may be iteratively fine-tuned using on the adversarial dataset in stages with descending learning rates. Prompt gradient interference and TCF may be used to gradually degrade parameters encoding links between real identifiers and PII.

The method may continue at step 4008 with validating removal of the PII associations. In some embodiments, the validation may be accomplished by attempting to extract erased PII associations from the fine-tuned LLM through at least one of prompts and/or validation queries configured to cause the fine-tuned LLM to provide an output containing the to-be-removed targeted PII association. If the targeted PII association is provided in an output of the fine-tuned LLM, step 4004 may be repeated 4008, such that the LLM is iteratively fine-tunes. When the targeted PII association is not comprised by the output of the LLM, the method 4000 may continue to step 4010. Such validation may be performed on one, any, or all identifiers and/or PII associations identified at step 4001.

The method 4000 may continue at step 4010 with evaluation and benchmark testing. Such evaluation may be performed by rigorously validating the removal of PII associations to be removed through adversarial attempts as described above, as well as metrics and statistical tests in light of the same. Such analysis may confirm the limited collateral removal of PII/UD associations that were not intended for removal. Moreover, known natural language processing and LLM benchmarks as are known in the art may be performed on the fine-tuned LLM to assess the model quality in light of the fine-tuning.

Figure 24:
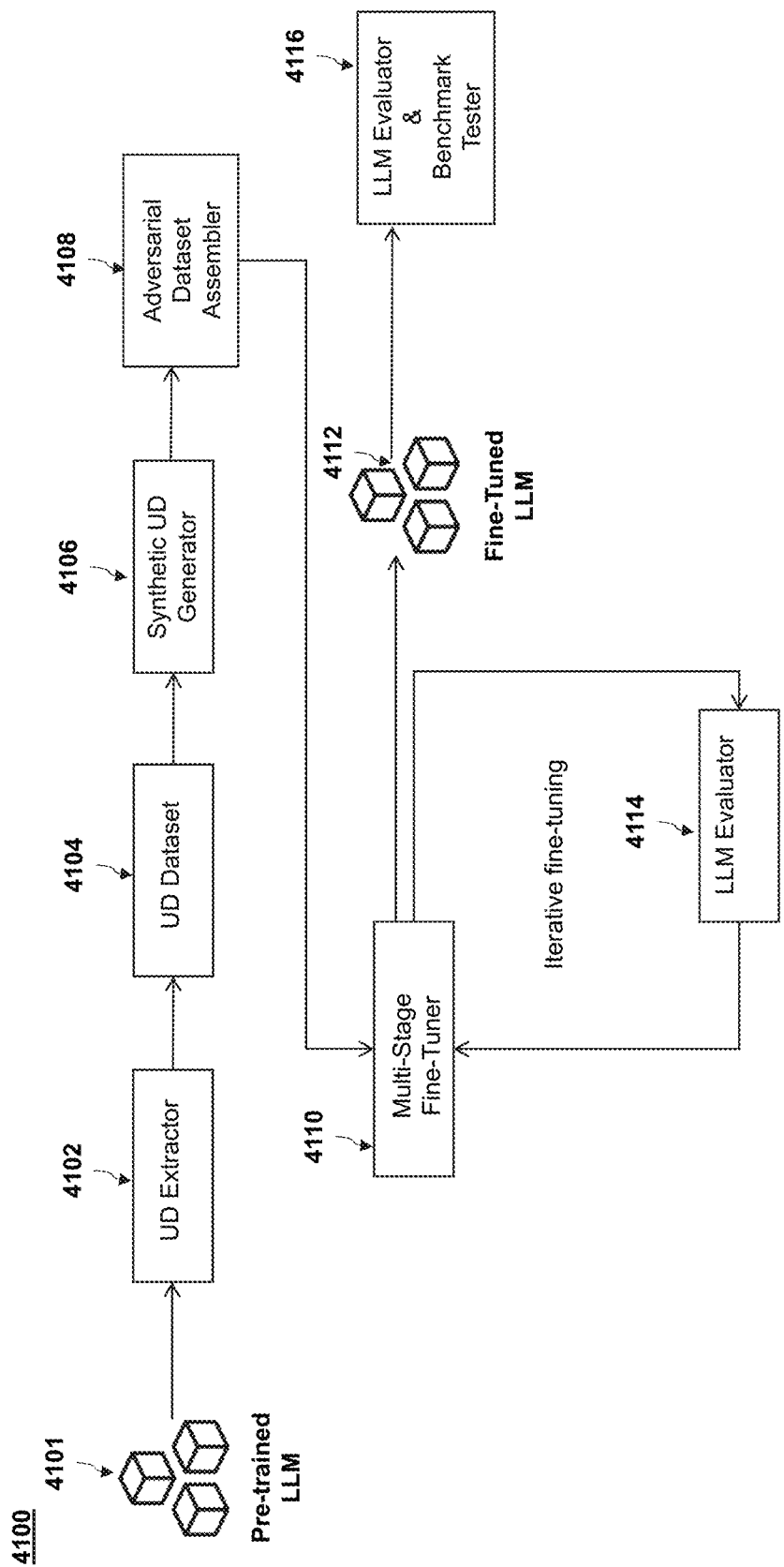
FIG. 24 is an illustration of the key components of an adversarial data fine-tuning system architecture, according to an embodiment of the invention.

Referring now to FIG. 24, an adversarial data fine-tuning system 4100 according to an embodiment of the invention is presented in more detail. The system 4100 may comprise a pre-trained LLM 4101. The LLM 4101 may be a pre-trained language model with embedded UDs in parameters that need to be erased. The system 4100 may further comprise an extractor module 4102 configured to identify and extract UD associations from LLM embeddings. The system 4100 may further comprise a UD dataset 4104 comprising the UD instance-UD association pairs identified by the extractor module 4102 to be removed from the LLM 4101. The system 4100 may further comprise a synthetic UD generator module 4106 configured to algorithmically generates synthetic UD instance-UD association pairs with adversarial correlations to real UD instance-UD association pairs comprised by the UD dataset 4104. The system 4100 may further comprise an adversarial dataset assembler module 4108 configured to assemble the real and synthetic UD instance-UD association pairs into an adversarial dataset for fine-tuning the LLM 4101. The system 4100 may further comprise a fine-tuner module 4110 configured to iteratively fine-tune the LLM 4101 on the adversarial dataset assembled by the adversarial dataset assembler 4108, in some embodiments with descending learning rates. The fine-tuner module 4110 may be a multi-stage fine-tuner.

The system 4100 may further comprise an LLM evaluator module configured to attempt to extract erased UD instances and/or UD associations from the LLM after being fine-tuned at least once by the fine-tuner module 4110 to validate removal of the UD instance/UD association therefrom. Such validation may be performed by generating a targeted prompt configured to extract a target UD instance/UD association of the one or more UD associations from the fine-tuned LLM, providing the targeted prompt to the fine-tuned LLM, receiving a targeted prompt response from the fine-tuned LLM, and evaluating the response as to whether it includes the target UD instance/association to be removed. If it has not been removed, the LLM may be further fine-tuned by the fine-tuner module 4110 iteratively until the targeted UD instance/UD associations have been removed from the LLM.

The system 4100 may further comprise an LLM evaluator and benchmark tester module 4116 configured to verify the targeted UD instances/associations have been removed through statistical tests. Benchmarking is done to evaluate broader quality changes of the LLM before and after fine-tuning.

Figure 25:
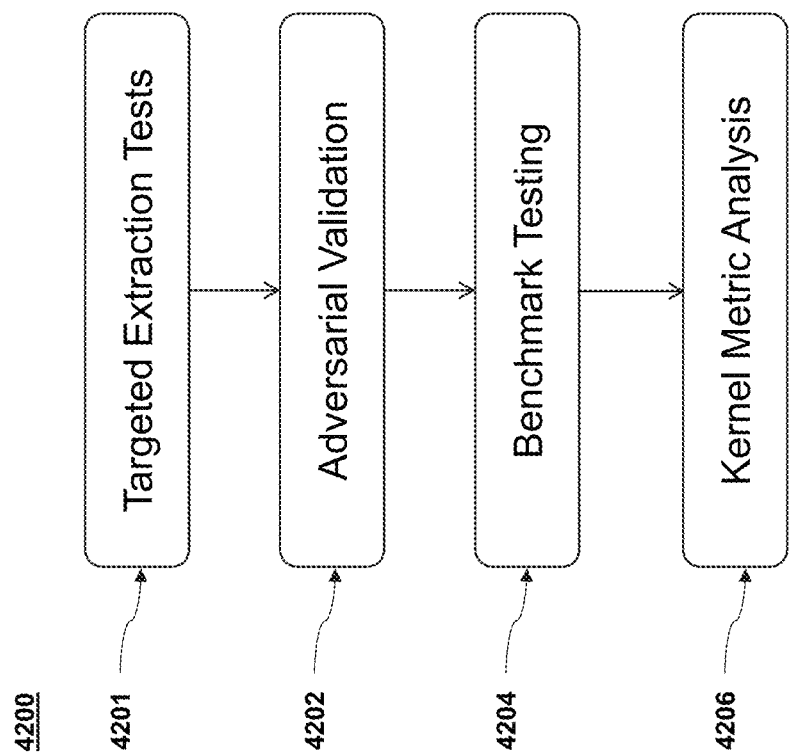
FIG. 25 is an illustration of a method of evaluating and testing an adversarial data fine-tuning system, according to an embodiment of the invention.

Referring now to FIG. 25, a method 4200 of evaluating and testing an adversarial data fine-tuning system are described in more detail. The evaluation methodology combines automated tests with adversarial human assessments for comprehensive verification. The transferability of the technique across multiple LLM architectures of varying scale and design is also tested. The solutions are designed to provably epitomize adaptive LLMs with capacity to responsibly forget privacy hazards within training data at scale proportional to erased PII size rather than model size.

The method 4200 comprises attempting the targeted extraction of erased UD from the LLM using strong prompts at step 4201. A decline in extraction success indicates the successful removal of the UD to be removed from the LLM. The method 4200 may continue at step 4202 with adversarial validation, where external adversarial testing by open-sourcing an unlearned LLM to invite non-trivial attacks by trying to extract the UD that was intended to be removed. The method 4200 may continue at step 4204 with benchmark testing, which may comprise quantifying performance on established NLP benchmarks before and after the fine-tuning to ensure minimal degradation of the performance of the fine-tuned LLM. The method 4100 may continue at step 4206 with performing a kernel metric analysis, where a centered kernel alignment is used to track representation dynamics and to quantify erosion of encoded links between UD instances and removed UD associations.

Figure 26:
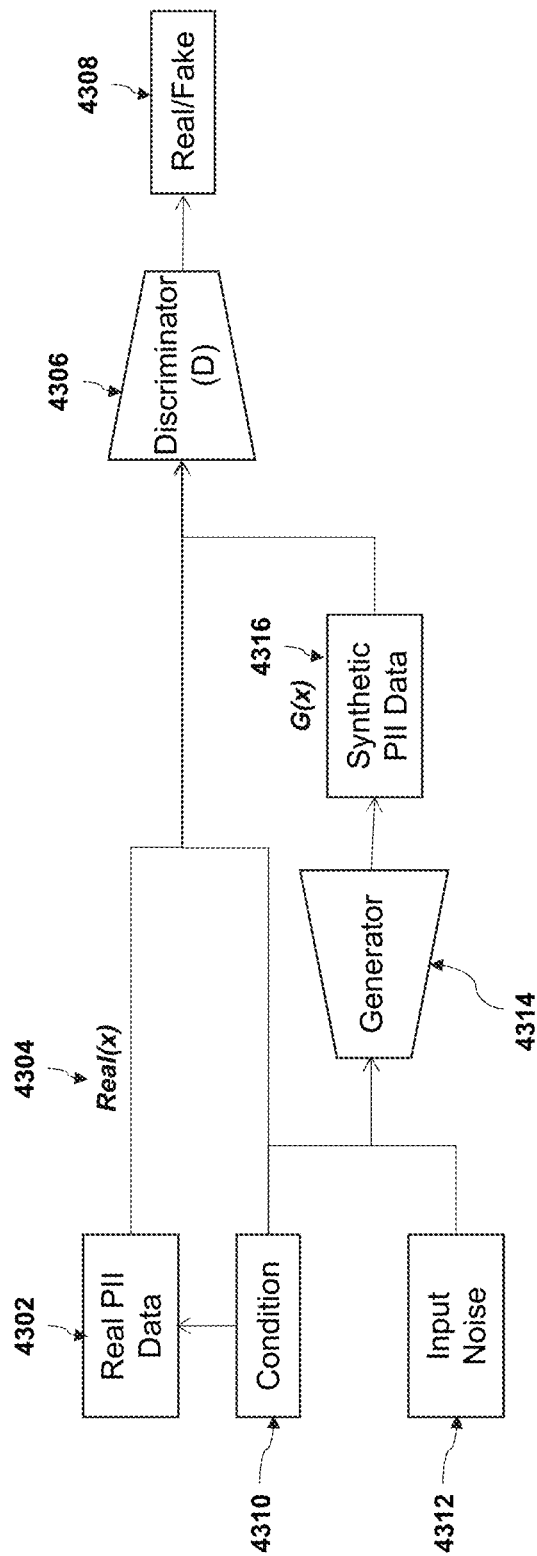
FIG. 26 is an illustration of a method of leveraging cGANs for adversarial data generation, according to an embodiment of the invention.

Referring now to FIG. 26, a method of leveraging cGANs for adversarial data generation is described in more detail. Generative Adversarial Networks (GANs) are a class of generative models that are used for generating realistic synthetic data across various domains, including images, text, and audio. Conditional Generative Adversarial Networks (cGANs) extend the capability of GANs by allowing the generation process to be conditioned on additional information, such as class labels or data attributes.

In the context of the present invention, cGANs are utilized for generating adversarial synthetic data designed to interfere with and degrade a large language model's (LLM's) ability to recall authentic associations or even access to non-public information that may be protected by a paywall (e.g., content accessible by subscription or license). cGANs may be able to generate data samples that mimics the characteristics of a target distribution while being explicitly conditioned on specific criteria. The type of adversarial data that may be generated may be configured to prevent the sharing, access, or extraction of personally identifiable information, copyrighted material, financial information, medical information, access-restricted information, confidential information, and the like.

One example of a cGAN architecture comprises two neural networks: a generator neural network 4314 and a discriminator neural network 4306, trained in an adversarial setting. The generator neural network 4314 is configured to receive an input condition 4310, such as a class label or a data distribution, and generate synthetic data samples 4316 responsive to the input condition. The discriminator neural network 4306 is configured to distinguish between the generated samples and authentic data samples comprised in an authentic data repository 4302 from a target distribution and provide a determination whether a given data sample is authentic or synthetic (real/fake) 4308. Through this adversarial training process, the generator neural network 4314 is trained to produce synthetic data samples 4316 that are increasingly realistic and indistinguishable from the real data 4302, as judged by the discriminator neural network 4306. Input noise 4312 may additionally be introduced to the generator neural network 4314 to increase randomness in the synthetic data 4316.

In the present invention, cGANs are utilized for the purpose of generating adversarial synthetic data samples for sensitive information that intentionally diverge from the authentic data distribution encoded within a pre-trained LLM. This divergence is engineered to collide with and degrade the LLM's ability to recall specific data associations, facilitating targeted unlearning or targeted catastrophic forgetting (TCF) of sensitive information.

To achieve this, a standard cGAN architecture and training objectives are modified. Instead of conditioning the generator neural network 4314 on class labels, the extracted authentic data distribution 4302 and associated semantic contexts are provided as the input condition. This allows the generator neural network 4314 to capture the intrinsic patterns and relationships present in the authentic data 4302.

However, rather than training the generator neural network 4314 to mimic the distribution of the authentic data 4302, a loss function of the generator neural network 4314 is altered to incorporate an adversarial term that increases the statistical divergence between the distribution of the synthetic data 4316 and the distribution of the authentic data 4302 relative to a typical loss function. In some embodiments, the loss function may maximize the statistical divergence between the distribution of the generated synthetic data and the distribution of the authentic data 4302.

The discriminator neural network 4306 may be trained to classify the generated synthetic data as either real or fake, i.e. authentic or synthetic, providing adversarial feedback to the generator neural network 4314. The generator neural network 4314 is further configured to generate synthetic data that not only causes the discriminator neural network 4306 to misclassify the synthetic data as real but also have increased divergence from the authentic data distribution, as guided by the adversarial loss term and the utility function. In some embodiments, the generator neural network 4314 may be configured to product maximal divergence from the authentic data distribution.

By iteratively training this modified cGAN architecture, the generator neural network 4314 is trained to produce adversarial synthetic data samples that collide with and interfere with the LLM's ability to recall authentic data associations. These adversarial samples can then be used in a fine-tuning process to induce targeted catastrophic forgetting (TCF) of the specific sensitive information instances or other confidential data embedded within the LLM's parameters.

Figure 27:
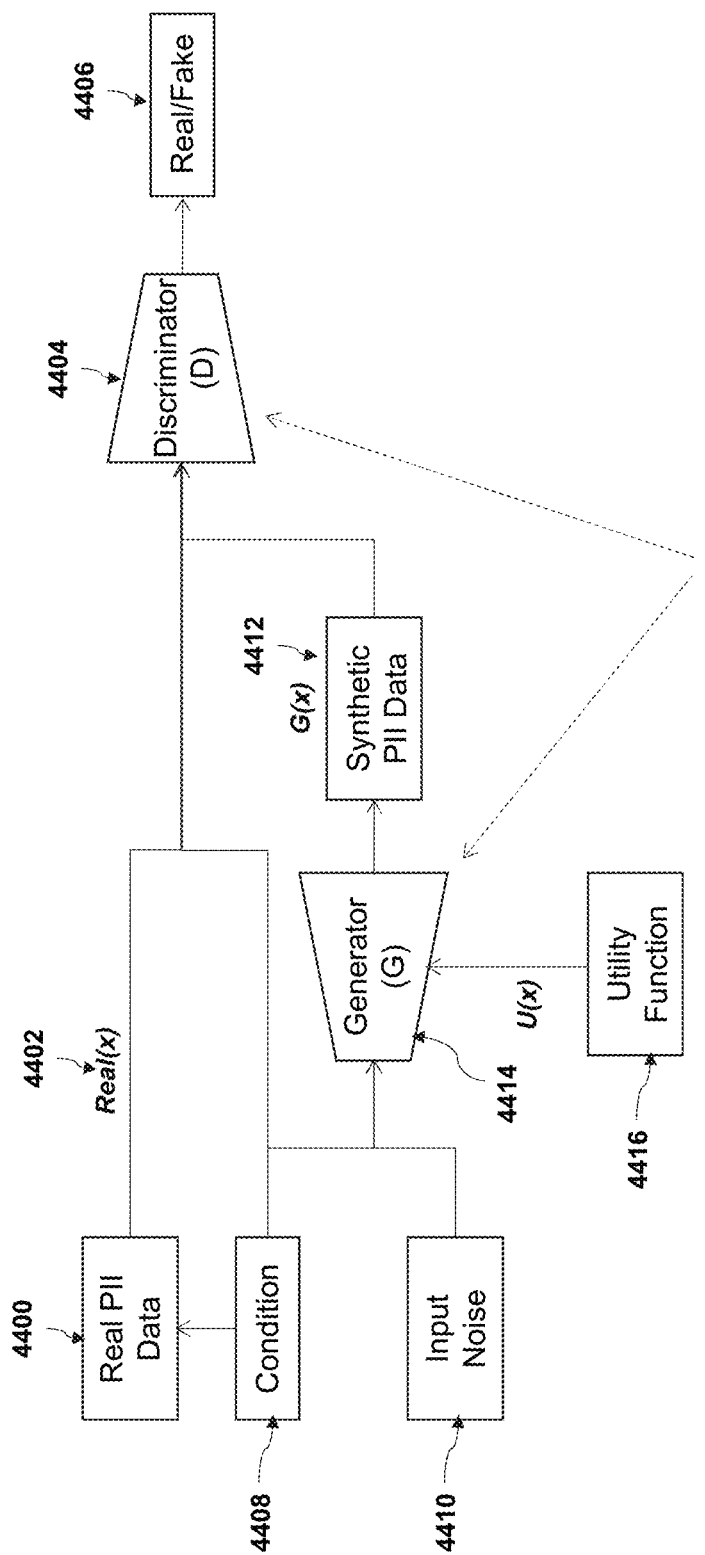
FIG. 27 is an illustration of a method of leveraging a modified cGAN for adversarial data generation, according to an embodiment of the invention.

Referring now to FIG. 27, a method of leveraging modified cGANs for adversarial data generation is described in more detail. In a traditional cGAN setup, the generator neural network 4414(G) takes an input condition, such as a class label or a data attribute, and generates synthetic data samples 4412 (G(x)) conditioned on that input. The discriminator neural network 4404(D) is configured to distinguish between the generated synthetic data samples 4412 and authentic data samples 4402 (Real(x)) from the target distribution. Through an adversarial training process, the generator neural network 4414 is trained to produce synthetic samples that are increasingly realistic and indistinguishable from the authentic data 4400, as judged by the discriminator neural network 4404.

In an embodiment of the present invention, the cGAN architecture is modified to generate synthetic data samples that intentionally diverge from the authentic data distribution, rather than mimicking or approximating it. This divergence is configured to collide with and degrade the LLM's ability to recall specific authentic data associations, facilitating targeted unlearning or targeted catastrophic forgetting (TCF) of sensitive information. The following embodiments of the invention may apply to confidential information protection as well, and not just PII fields.

Modifications to the cGAN architecture may include:
1. Input Condition: Instead of conditioning the generator neural network 4414 on class labels or attributes, the input condition 4408 comprises the extracted authentic data distribution and associated semantic contexts from the LLM's training data. This allows the generator neural network 4414 to capture the intrinsic patterns and relationships present in the authentic data 4400.
2. Generator Neural Network: The generator neural network 4414 may be trained to produce synthetic data samples 4412 that diverge from the authentic data distribution, guided by an adversarial objective function. This objective function may incorporate an adversarial loss term that increase and/or maximizes the statistical divergence between the generated synthetic data distribution and the authentic data distribution, weighted by a utility function U(x) 4416.
3. Discriminator Neural Network: The discriminator neural network 4404 may be trained to classify the synthetic data samples generated by the generator network 4414 as either real or fake (authentic or synthetic), providing adversarial feedback to optimize The generator neural network 4414). The objective of the discriminator neural network 4404 is to accurately distinguish between authentic data samples and synthetic data samples, while the objective of the generator neural network 4414 is to generate samples that can cause the discriminator neural network 4404 to misclassify synthetic data samples as authentic data samples while maximally diverging from the authentic data distribution.

4. Adversarial Objective Function: The adversarial objective function or loss function used to train the generator neural network 4414 may comprise two key components: (a) an adversarial loss term ($L_{adv}$) that increases and/or maximizes the divergence between the synthetic data 4412 output by the generator neural network 4414 and the authentic data distribution, weighted by the utility function U(x) 4416, and (b) a cross-entropy loss term quantifying how well the generator neural network 4414 can cause the discriminator neural network 4414 to misclassify the synthetic data samples as authentic. The utility function U(x) 4416 assigns importance scores to each data field x based on usefulness. The adversarial loss term ($L_{adv}$) may be as follows:

$$L_{adv} = \sum [(1 - U(x)) * \text{Divergence } (G(x), \text{Real}(x))]$$

where Divergence (G(x), Real(x)) is the divergence between the distribution of the synthetic data and the distribution of the authentic data.

A weighted adversarial loss Lady is computed by multiplying the adversarial divergence for each x with (1−U(x)). This makes divergence inversely weighted by utility. The cGAN generator loss is as follows:

$$L_G = L_{adv} + \lambda * CrossEntropy \text{ (discriminator)}$$

where CrossEntropy(discriminator) is the cross-entropy loss term of the discriminator neural network 5. Utility Function: The utility function 4416, denoted as U(x), assigns variable importance scores to different PII data fields (x). The utility function may facilitate controlling the relative degree of divergence or adversariality from the authentic data distribution on a per-field basis during the adversarial data generation process. This flexibility improves the likelihood that the unlearning process can be configured to balance between effective targeted catastrophic forgetting (TCF) of sensitive information and preserving the utility and relevance of certain data fields that may be beneficial for the LLM's intended applications.

6. Cross-Entropy Loss Term: The cross-entropy loss term quantifies how well the generator neural network 4414 can cause the discriminator neural network 4404 to misclassify the synthetic data samples as real. This term is based on the traditional cross-entropy loss used in classification tasks, where the output probabilities of the discriminator neural network 4404 for classifying the synthetic data samples as authentic or synthetic are evaluated against the true labels (real or fake). By incorporating this term into the adversarial objective function, the generator neural network 4414 is further configured to generate synthetic data samples that are not only divergent from the authentic data distribution but also plausible and realistic enough to cause the discriminator neural network 4404 to misclassify them as authentic, increasing the likelihood the generated synthetic data 4510 remains coherent and semantically meaningful.

7. Tunable Adversariality: The generator loss function ($L_G$) includes a tunable parameter $\lambda$ that balances the adversarial loss term ($L_{adv}$) with the cross-entropy loss term (CrossEntropy(D)), allowing for control over the degree of adversariality or divergence from the authentic data distribution. By adjusting the value of $\lambda$, the trade-off between maximizing divergence from the authentic data distribution (prioritizing effective unlearning) and causing the discriminator neural network 4404 to misclassify synthetic data samples as authentic (prioritizing plausibility and coherence) can be controlled. A higher value of $\lambda$ results in a "softer" adversarial approach, where The generator neural network 4414 is configured to be tailored to generating synthetic data samples that can cause the discriminator neural network 4404 to misclassify synthetic data samples while still exhibiting some divergence from the authentic data distribution. Conversely, a lower value of $\lambda$ shifts the emphasis towards maximizing the adversarial loss term, leading to a "harder" adversarial approach with greater divergence from the authentic data distribution, potentially at the cost of reduced plausibility or coherence in the generated synthetic data samples.

The adversarial objective function, combining the adversarial loss term, cross-entropy loss term, and the tunable adversariality parameter $\lambda$, enhances control over the adversarial data generation process. Improving the objective function during the training of the modified cGAN, The generator neural network 4414 may be trained to generate synthetic data samples that are balanced between having increased divergence and/or maximally diverging from the authentic data distribution, preserving utility through the weighting of U(x), and maintaining plausibility to cause the discriminator neural network 4404 to misclassify generated synthetic data samples. U(x) 4416 can be dynamically tuned per sample or user role. E.g. increase U(location) for queries needing locations. Similarly, $\lambda$ can modulate the degree of adversariality. Higher $\lambda$ implies softer adversarial collision. With these modifications, the overall loss used to train the adversarial generator now has in-built knobs to alter the collision hardness for different data fields based on a use-case specific U(x) and $\lambda$.

Referring now to FIG. 27, the utility function used in cGAN for adversarial PII data generation is described in more detail. The motivation behind the utility function U(x) 4416 is that certain data fields may hold varying degrees of relevance or utility for the intended use-cases of the large language model (LLM). For instance, in scenarios where the LLM is expected to provide location-based recommendations or analysis, retaining some level of location information might be desirable, even after the unlearning process. We call this "soft" adversarial approach where certain information is retained to ensure the utility is not impacted. Similarly, certain fields like email addresses or social security numbers may be considered highly sensitive and require complete unlearning, while others like names or addresses might warrant a more nuanced approach.

The utility function U(x) 4416 provides a flexible mechanism to quantify and encode these varying degrees of importance for different data fields. It assigns a utility score, typically ranging from 0 to 1, to each data field x, where a higher score indicates greater importance or utility for that field in the context of the LLM's intended applications. By incorporating the utility function U(x) into the adversarial objective function or loss function used to train the cGAN for adversarial PII data generation, the invention enables precise control over the relative divergence or "collision hardness" for each PII field x.

Specifically, the adversarial loss term in the objective function may be weighted by (1−U(x)) for each data field x. This formulation increases the likelihood that fields with higher utility scores (closer to 1) diverge less from the authentic data distribution, preserving their relevance and utility. Conversely, fields with lower utility scores (closer to 0) are allowed to diverge more significantly from the authentic data distribution, facilitating more aggressive unlearning or forgetting of those sensitive fields.

The utility function U(x) 4416 can be designed and tuned based on domain knowledge, user preferences, regulatory requirements, or other relevant factors. It can be specified as a static function, assigning fixed utility scores to each data field, or it can be dynamically adjusted and adapted based on the specific use-case or context in which the LLM is being employed. Furthermore, the invention allows for the utility function U(x) to be customized and controlled at various levels, such as per individual PII instance, per user or user role, or even per query or prompt. This granular control facilitates tailoring the unlearning process to meet the unique requirements and constraints of different applications or user profiles.

By incorporating the utility function U(x) into the adversarial data generation process, the present invention strikes a balance between effectively unlearning sensitive information from LLMs while preserving the utility and relevance of certain data fields that may be beneficial or necessary for the LLM's intended use-cases. This approach to targeted catastrophic forgetting (TCF) through adversarial data generation represents a significant advancement in the responsible deployment and management of LLMs.

Figure 28:
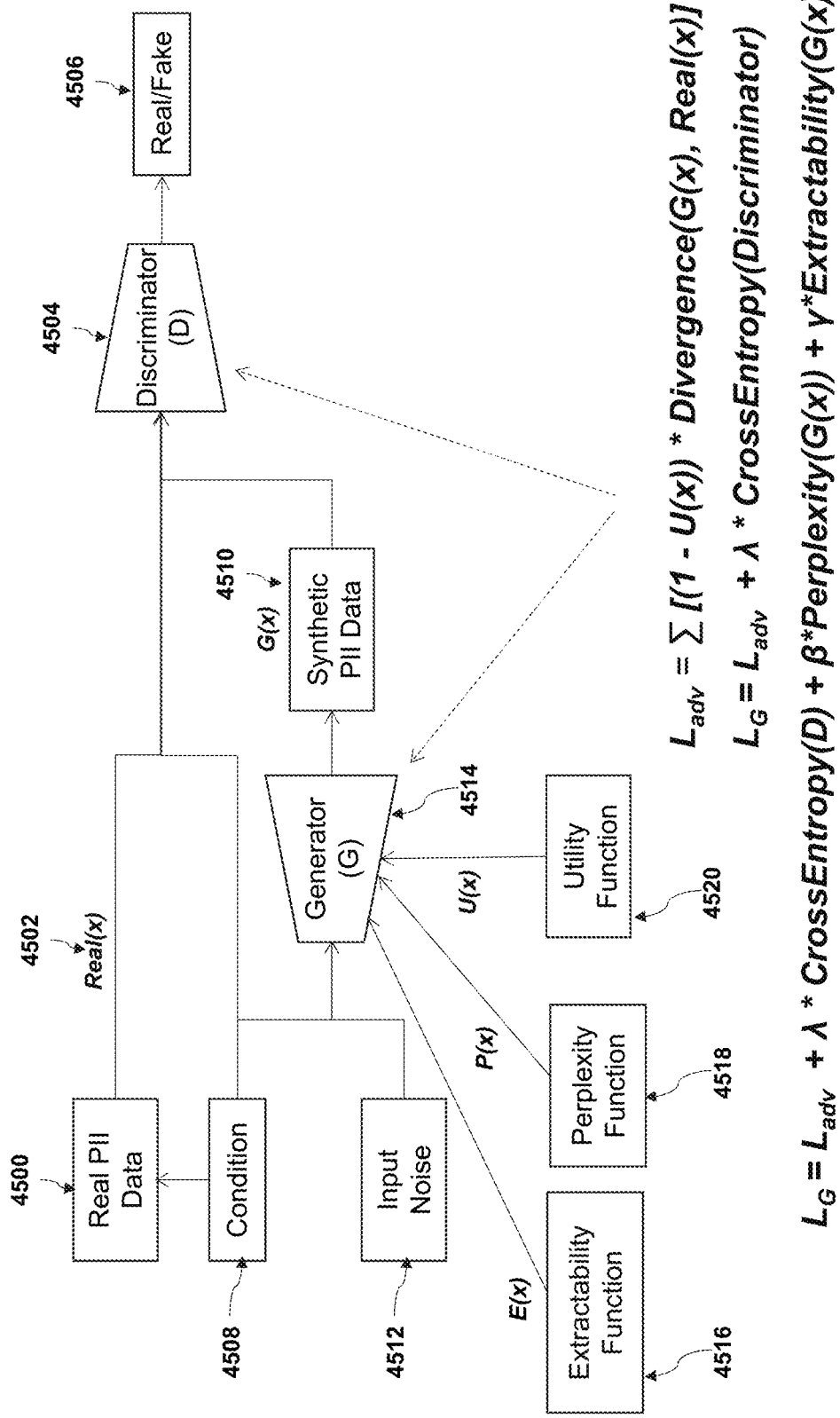
FIG. 28 is an illustration of a method of leveraging a modified cGAN for adversarial data generation utilizing additional parameters for the adversarial objective function or loss function, according to an embodiment of the invention.

Referring now to FIG. 28, additional parameters for the adversarial objective function (or loss function) according to an embodiment of the invention are described in more detail. The cGAN of the embodiment comprises a generator neural network 4514 configured to generate synthetic data 4510 responsive to receiving an input condition 4508 as described above, and, in some instances, further incorporating input noise 4512. A discriminator neural network 4504 may be configured to classify authentic data 4500 and synthetic data 4510 as authentic or synthetic (real or fake) 4506. The core adversarial objective function or loss function of the generator neural network 4514, incorporating the adversarial loss term ($L_{adv}$), cross-entropy loss term, and the tunable adversariality parameter $\lambda$ is as follows:

$$L_{adv} = \sum [(1 - U(x)) * \text{Divergence}(G(x), \text{Real}(x))]; \text{ and}$$

$$L_G = L_{adv} + \lambda * CrossEntropy(D)$$

While the core adversarial objective function or loss function provides a robust framework for generating adversarial synthetic data, the present invention further comprises incorporating additional metrics and parameters to refine and optimize the adversarial data generation and targeted catastrophic forgetting (TCF) process, as follows:

$$L_G = L_{adv} + \lambda * CrossEntropy(D) +$$
$$\beta * \text{Perplexity}(G(x)) + \gamma * \text{Extractability}(G(x))$$

The additional parameters are as follows:
1. Perplexity (G(x)): Perplexity 4518 evaluates how well G 4514 models the language distribution. Keeping this low preserves utility. Perplexity is a widely used metric in natural language processing and language modeling that evaluates how well a generative model captures and represents the underlying distribution of the data. In the context of adversarial data generation, minimizing the perplexity of the output of the generator neural network 4514(G) can help preserve the utility and coherence of the generated synthetic data samples, ensuring they remain plausible and consistent with the intended language distribution. By incorporating a perplexity term into the adversarial objective function, denoted as Perplexity (G(x)) 4518, where x represents the generated synthetic data sample, the invention is configured to balance between maximizing divergence from the authentic data distribution for effective unlearning and maintaining utility and coherence in the generated data.
2. Extractability (G(x)): Extractability 4516 estimates the likelihood or ease with which the generated synthetic data samples can be extracted or identified from the large language model (LLM) after the unlearning process. Lower extractability directly aligns with the objective of effective targeted catastrophic forgetting, as it indicates a reduced ability to retrieve or recall the sensitive PII information from the LLM. By incorporating an extractability term into the adversarial objective function, the invention directly optimizes the forgetting objective, guiding the generator G to produce synthetic PII samples that are inherently more difficult to extract or associate with real PII instances within the LLM's parameters.
3. Beta, Gamma: $\beta$ and $\gamma$ are tunable hyperparameters that control the relative contributions of the perplexity and extractability terms, respectively.

The inclusion of the perplexity term, weighted by the hyperparameter $\beta$, facilitates preserving the utility and coherence of the generated adversarial synthetic data, improving the likelihood it remains consistent with the language distribution and semantically meaningful. The extractability term, weighted by the hyperparameter $\gamma$, directly optimizes the forgetting objective by encouraging G to generate synthetic PII samples that are inherently more difficult to extract or associate with real PII instances within the LLM's parameters. By incorporating these additional metrics and tunable hyperparameters into the adversarial objective function, the present invention provides a comprehensive and flexible framework for generating tailored adversarial synthetic data that balances the competing objectives of effective targeted catastrophic forgetting, utility preservation, and plausibility of the generated data.

Figure 29:
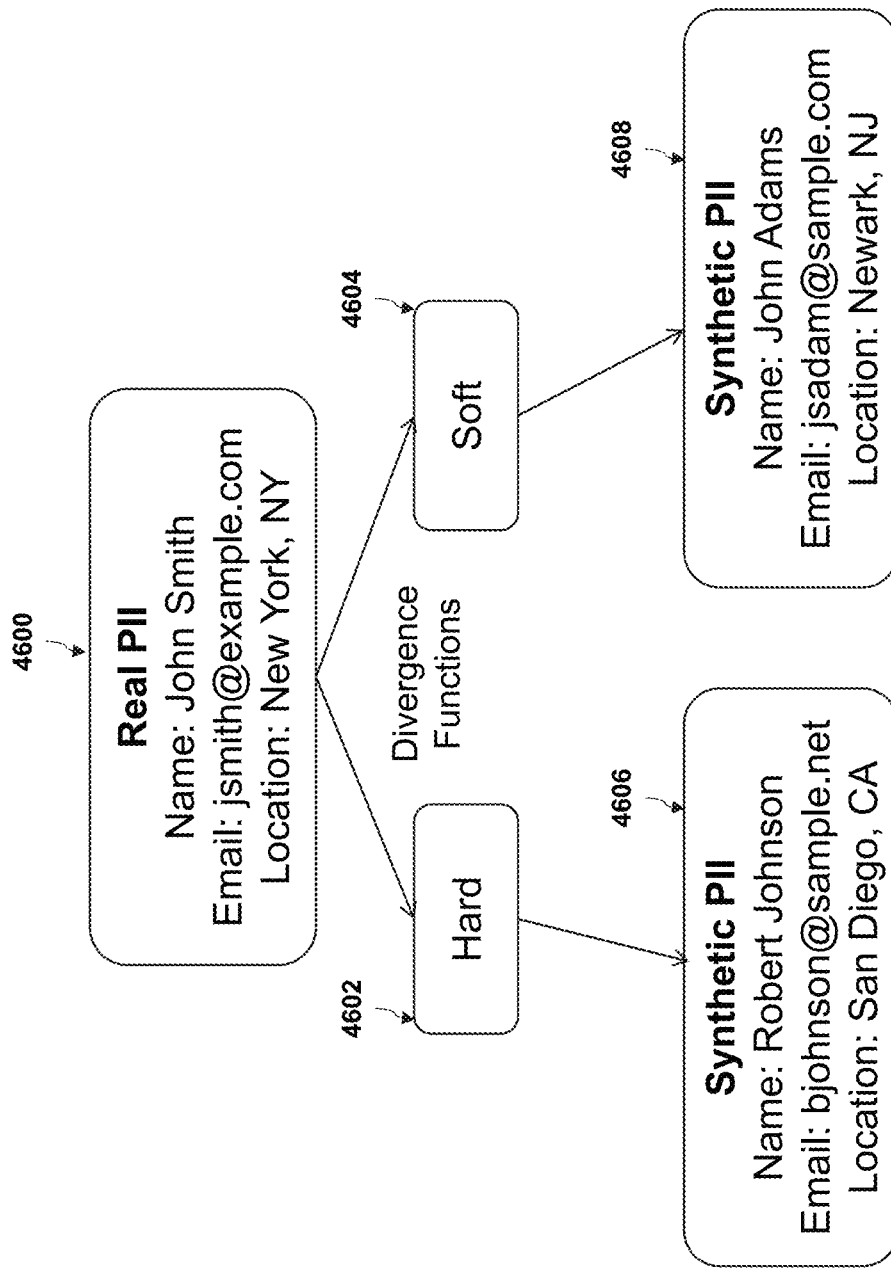
FIG. 29 is an illustration of an example of adversarial data, according to an embodiment of the invention.

Referring now to FIG. 29, an example of adversarial data generated in a cGAN architecture is described in more detail. To illustrate the operation of the modified cGAN architecture, let us consider a hypothetical example of authentic PII data extracted from an LLM's training corpus. Suppose the PII extraction module identifies the following set of linked sensitive information: (Name: John Smith, Email: jsmith@example.com, Location: New York, NY)

4600. When this real PII data distribution is provided as input to the modified cGAN architecture, the generator network (G) is tasked with generating adversarial synthetic PII samples that intentionally diverge from the authentic data distribution, guided by the adversarial objective function and the utility function U(x).

In the hard adversarial approach 4602, the adversarial synthetic PII sample 4606 generated by G might resemble the following: (Name: Robert Johnson, Email: bjohnson@sample.net, Location: San Diego, CA) 4606. In this adversarial synthetic sample, G has generated a new name, email address and location that diverge significantly from the real PII data, facilitating effective unlearning of the specific individual's name and email association.

Where the utility function U(x) assigns a relatively high utility score to the "Location" field, indicating that retaining some level of location information is desirable for the intended use-cases of the LLM. In the soft adversarial approach 4604, the adversarial synthetic PII sample 4608 generated by G might resemble the following: (Name: John Adams, Email: jsadam@sample.com, Location: Newark, NJ) 4608. In this adversarial synthetic sample, G has generated a new name and email address that diverge significantly from the real PII data, facilitating effective unlearning of the specific individual's name and email association. However, due to the higher utility assigned to the "Location" field, the generated location remains within a plausible geographic context (a nearby city), preserving some level of utility for location-based analysis or recommendations.

This embodiment illustrates how the modified cGAN architecture, coupled with the utility function U(x), enables the generation of adversarial synthetic PII data that strikes a balance between maximally diverging from the real PII distribution for effective unlearning and preserving the utility and relevance of certain PII fields based on the specific requirements of the LLM's intended applications.

Throughout the application, reference may be made to various computer hardware, including servers, GPUs, storage, cloud storage, and the like. It is contemplated and included within the scope of the invention that the CatchUp system and its various components may be software executed on computer devices, including servers, personal computers, smartphone devices, and the like, each comprising a processor configured to execute commands received from software (such as microprocessors, field-programmable gate arrays, integrated circuits, and the like), a non-transitory computer-readable storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described CatchUp functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method for generating adversarial data for use in a large language model (LLM) comprising:
   receiving an input condition at a generator neural network;
   generating synthetic data responsive to the input condition by the generator neural network, a distribution of the synthetic data being configured to diverge from a distribution of authentic data;
   receiving each of the input condition, the synthetic data, and the authentic data at a discriminator neural network; and
   classifying each of the synthetic data and the authentic data as being one of authentic or synthetic by the discriminator neural network.

2. The method of claim 1 wherein:
   the generator neural network comprises an adversarial objective function used in generating the synthetic data; and
   the adversarial objective function is configured to at least one of increase the divergence between the distribution of the synthetic data and the distribution of the authentic data and maximize a statistical divergence between the distribution of the synthetic data and the distribution of the authentic data.

3. The method of claim 2 wherein the adversarial objective function comprises an adversarial loss term configured to at least one of increase the divergence between the distribution of the synthetic data and the distribution of the authentic data and maximize the divergence between the distribution of the synthetic data and the distribution of the authentic data.

4. The method of claim 3 wherein the adversarial objective function further comprises a utility function configured to weight one or more data fields comprised by at least one of the synthetic data and the authentic data.

5. The method of claim 4 wherein the adversarial loss term is defined by the equation:

$$Ladv = \sum [(1 - U(x)) * \text{Divergence}(G(x), \text{Real}(x))]$$

where Ladv is the adversarial loss term, U(x) is the utility function, G(x) is the distribution of the synthetic data, Real(x) is the distribution of the authentic data, and Divergence (G(x), Real(x)) is the divergence between the distribution of the synthetic data and the distribution of the authentic data.

6. The method of claim 5 wherein the adversarial objective function further comprises a generator loss term that represents a generator loss introduced by the synthetic data when evaluated by the discriminator neural network, the generator loss term being defined by the adversarial loss term, a cross-entropy loss term of the discriminator neural network configured to quantify an effectiveness of the generator neural network to cause the discriminator neural network to misclassify synthetic data as authentic data, and a tunable loss parameter configured to balance the adversarial loss term with the cross-entropy loss term.

7. The method of claim 6 wherein the generator loss introduced by the synthetic data is defined by the equation:

$$LG = Ladv + \lambda * CrossEntropy(\text{discriminator})$$

where LG is the generator loss term, $\lambda$ is the tunable loss parameter, and CrossEntropy(discriminator) is the cross-entropy loss term of the discriminator neural network.

8. The method of claim 7 wherein the generator loss term is further defined by at least one of a perplexity function of the generator neural network that determines an effectiveness of the generator neural network in matching a language distribution of the authentic data, a perplexity hyperparameter for controlling a relative contribution of the perplexity function to the generator loss, an extractability function of the generator neural network that determines a likelihood of the synthetic data being extracted from the LLM, and an extractability hyperparameter for controlling a relative contribution of the extractability function to the generator loss.

9. The method of claim 8 wherein the generator loss is defined by the equation:

$$LG = Ladv + \lambda * CrossEntropy(\text{discriminator}) + \beta * \text{Perplexity}(G(x)) + \gamma * \text{Extractability}(G(x))$$

where $\beta$ is the perplexity hyperparameter, Perplexity (G(x)) is the perplexity function of the generator neural network, $\gamma$ is the extractability hyperparameter, and Extractability(G(x)) is the extractability function of the generator neural network.

10. The method of claim 1 wherein the synthetic data and the authentic data comprises at least one of personally identifiable information, copyrighted content, financial information, or medical information.

11. The method of claim 1 wherein the generator neural network is trained on data extracted from the LLM.

12. The method of claim 1 wherein the generator neural network and the discriminator neural network are comprised by a conditional generative adversarial network.

13. A device for operating a conditional generative adversarial network for use in a large language model (LLM) comprising:
a non-transitory computer-readable storage medium having stored thereon:
a database of authentic data; and
a database of synthetic data; and
one or more processors configured to:
operate a generator neural network configured to:
receive an input condition; and
generate the synthetic data stored in the database of synthetic data responsive to the input condition, a distribution of the synthetic data being configured to diverge from a distribution of the authentic data; and
operate a discriminator neural network configured to:
receive each of the input condition, the synthetic data, and the authentic data at the discriminator neural network; and
classify each of the synthetic data and the authentic data as being one of authentic or synthetic by the discriminator neural network.

14. The device of claim 13, wherein:
the generator neural network comprises an adversarial objective function used in generating the synthetic data; and
the adversarial objective function is configured to at least one of increase the divergence between the distribution of the synthetic data and the distribution of the authentic data and maximize a statistical divergence between the distribution of the synthetic data and the distribution of the authentic data.

15. The device of claim 14, wherein the adversarial objective function comprises an adversarial loss term configured to at least one of increase the divergence between the distribution of the synthetic data and the distribution of the authentic data and maximize the divergence between the distribution of the synthetic data and the distribution of the authentic data.

16. The device of claim 15, wherein the adversarial objective function further comprises a utility function configured to weight one or more data fields comprised by at least one of the synthetic data and the authentic data.

17. The device of claim 16, wherein the adversarial loss term is defined by the equation:

$$Ladv = \sum [(1 - U(x)) * \text{Divergence}(G(x), \text{Real}(x))]$$

where Ladv is the adversarial loss term, U(x) is the utility function, G(x) is the distribution of the synthetic data, Real(x) is the distribution of the authentic data, and Divergence(G(x), Real(x)) is the divergence between the distribution of the synthetic data and the distribution of the authentic data.

18. The device of claim 17, wherein the adversarial objective function further comprises a generator loss term that represents a generator loss introduced by the synthetic data when evaluated by the discriminator neural network, the generator loss term being defined by the adversarial loss term, a cross-entropy loss term of the discriminator neural network configured to quantify an effectiveness of the generator neural network to cause the discriminator neural network to misclassify synthetic data as authentic data, and a tunable loss parameter configured to balance the adversarial loss term with the cross-entropy loss term.

19. The device of claim 18, wherein the generator loss introduced by the synthetic data is defined by the equation:

$$LG = Ladv + \lambda * CrossEntropy(\text{discriminator})$$

where LG is the generator loss term, $\lambda$ is the tunable loss parameter, and CrossEntropy (discriminator) is the cross-entropy loss term of the discriminator neural network.

20. The device of claim 19, wherein the generator loss term is further defined by at least one of a perplexity function of the generator neural network that determines an effectiveness of the generator neural network in matching a language distribution of the authentic data, a perplexity hyperparameter for controlling a relative contribution of the perplexity function to the generator loss, an extractability function of the generator neural network for that determines a likelihood of the synthetic data being extracted from the LLM, and an extractability hyperparameter controlling a relative contribution of the extractability function to the generator loss.

21. The device of claim 20 wherein the generator loss is defined by the equation:

$$LG = Ladv + \lambda * CrossEntropy(\text{discriminator}) +$$
$$\beta * \text{Perplexity}(G(x)) + \gamma * \text{Extractability}(G(x))$$

where $\beta$ is the perplexity hyperparameter, Perplexity(G(x)) is the perplexity function of the generator neural network, $\gamma$ is the extractability hyperparameter, and Extractability(G(x)) is the extractability function of the generator neural network.

22. The device of claim 13, wherein the synthetic data and the authentic data comprises at least one of personally identifiable information, copyrighted content, financial information, or medical information.

23. The device of claim 13, wherein the generator neural network is trained on data extracted from the LLM.

24. The device of claim 13 wherein the generator neural network and the discriminator neural network are comprised by a conditional generative adversarial network.

* * * * *